US 6,687,805 B1

(12) United States Patent  
Cochran

(10) Patent No.: US 6,687,805 B1
(45) Date of Patent: Feb. 3, 2004

(54) METHOD AND SYSTEM FOR LOGICAL-OBJECT-TO-PHYSICAL-LOCATION TRANSLATION AND PHYSICAL SEPARATION OF LOGICAL OBJECTS

(75) Inventor: Robert Alan Cochran, Rocklin, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 504 days.

(21) Appl. No.: 09/699,596

(22) Filed: Oct. 30, 2000

(51) Int. Cl.[7] ............................................. G06F 12/10
(52) U.S. Cl. ........................ 711/209; 711/112; 711/114; 711/202; 707/205
(58) Field of Search ............................ 711/4, 170–173, 711/200–209, 112, 114; 707/103, 204–205; 709/316, 320; 717/108, 116; 714/6

(56) References Cited

U.S. PATENT DOCUMENTS 6,385,706 B1 * 5/2002 Ofek et al. .................. 711/162
6,487,561 B1 * 11/2002 Ofek et al. .................. 707/204
6,542,909 B1 * 4/2003 Tamer et al. ................ 707/205

* cited by examiner

Primary Examiner—Nasser G. Moazzami

(57) ABSTRACT

A method and system for providing to a human user or high-level application program a functional interface for translating the names of logical objects into physical mappings of logical objects to physical storage locations within a mass storage device and for allowings a human user or high-level application program to request that two logical objects be physically separated within a mass storage device so that a single failure cannot corrupt both logical objects, the physical separation optionally monitored over time to guarantee that logical objects are not subsequently remapped in a way that results in partial or full overlap.

17 Claims, 14 Drawing Sheets

_US 6,687,805 B1_

METHOD AND SYSTEM FOR LOGICAL-OBJECT-TO-PHYSICAL-LOCATION TRANSLATION AND PHYSICAL SEPARATION OF LOGICAL OBJECTS

TECHNICAL FIELD

The present invention relates to the physical locations of logical objects in mass storage devices and, in particular, to a method and system for providing logical-object-to-physical-location translations and for providing physical separation of logical objects, where the translations and physical separations are requested by high-level application programs executed on a host computer or human users interacting with a host computer that accesses and manipulates logical objects stored on a remote mass storage device, such as a disk array.

BACKGROUND OF THE INVENTION

The present invention relates to the access and manipulation of logical objects stored on remote mass storage devices by high-level application programs executing on host computers connected to the mass storage devices. The present invention is described and illustrated with reference to an embodiment partially included in a disk array controller that services I/O requests from a number of remote computers. However, alternative embodiments of the present invention may be employed in controllers of many other types of storage devices as well as in general electronic data storage applications.

FIG. 1 illustrates data storage within a platter of a hard disk drive. The platter is a thin disk, coated with a magnetic medium, such as iron oxide. Data can be stored in tiny areas of the surface of the platter having induced, stable magnetic fields. The surface of the disk platter 102 is divided into concentric rings, or tracks, such as tracks 104–105 in FIG. 1. Current disk platters contain many thousands of tracks. Each track is divided into radial segments, or sectors, such as sector 106 of track 104 in FIG. 1. Sectors each normally comprise a fixed number of bytes, normally 256, 512, 1024, or 2048 bytes. Data is normally retrieved from, and stored to, a hard disk drive in units of sectors. Once a sector is read from a disk and stored into computer memory, a program may access individual bytes and bits within the sector by accessing the random memory in which the sector is stored. Thus, the physical location of data on a disk platter can be described by a starting location and an ending location, each location specified as a track/sector/byte triple. Normally, a hard disk drive contains a number of platters aligned in parallel along a spindle passing through the center of each platter. Typically, the track and sectors of the platter can be thought of as aligned to form cylinders spanning the platters. In such hard disk drives, the physical address of a byte of data may also be described by a track/sector/byte triplet, where the byte within an aligned group of sectors composing a section of a cylinder are consecutively ordered.

FIG. 2 is a block diagram of a standard disk drive. The disk drive 201 receives input/output ("I/O") requests from remote computers via a communications medium 202 such as a computer bus, fibre channel, or other such electronic communications medium. For many types of storage devices, including the disk drive 201 illustrated in FIG. 2, the vast majority of I/O requests are either READ or WRITE requests. A READ request requests that the storage device return to the requesting remote computer some requested amount of electronic data stored within the storage device. A WRITE request requests that the storage device store electronic data furnished by the remote computer within the storage device. Thus, as a result of a READ operation carried out by the storage device, data is returned via communications medium 202 to a remote computer, and as a result of a WRITE operation, data is received from a remote computer by the storage device via communications medium 202 and stored within the storage device.

The disk drive storage device illustrated in FIG. 2 includes controller hardware and logic 203 including electronic memory, one or more processors or processing circuits, and controller firmware, and also includes a number of disk platters 204 coated with a magnetic medium for storing electronic data. The disk drive contains many other components not shown in FIG. 2, including read/write heads, a high-speed electronic motor, a drive shaft, and other electronic, mechanical, and electromechanical components. The memory within the disk drive includes a request/reply buffer 205 which stores I/O requests received from remote computers and an I/O queue 206 that stores internal I/O commands corresponding to the I/O requests stored within the request/reply buffer 205. Communication between remote computers and the disk drive, translation of I/O requests into internal I/O commands, and management of the I/O queue, among other things, are carried out by the disk drive I/O controller as specified by disk drive I/O controller firmware 207. Translation of internal I/O commands into electromechanical disk operations in which data is stored onto, or retrieved from, the disk platters 204 is carried out by the disk drive I/O controller as specified by disk media read/write management firmware 208. Thus, the disk drive I/O control firmware 207 and the disk media read/write management firmware 208, along with the processors and memory that enable execution of the firmware, compose the disk drive controller.

Individual disk drives, such as the disk drive illustrated in FIG. 2, are normally connected to, and used by, a single remote computer, although it has been common to provide dual-ported disk drives for use by two remote computers and multi-port disk drives that can be accessed by numerous remote computers via a communications medium such as a fibre channel. However, the amount of electronic data that can be stored in a single disk drive is limited. In order to provide much larger-capacity electronic data storage devices that can be efficiently accessed by numerous remote computers, disk manufacturers commonly combine many different individual disk drives, such as the disk drive illustrated in FIG. 2, into a disk array device, increasing both the storage capacity as well as increasing the capacity for parallel I/O request servicing by concurrent operation of the multiple disk drives contained within the disk array.

FIG. 3 is a simple block diagram of a disk array. The disk array 302 includes a number of disk drive devices 303, 304, and 305. In FIG. 3, for simplicity of illustration, only three individual disk drives are shown within the disk array, but disk arrays may contain many tens or hundreds of individual disk drives. A disk array contains a disk array controller 306 and cache memory 307. Generally, data retrieved from disk drives in response to READ requests may be stored within the cache memory 307 so that subsequent requests for the same data can be more quickly satisfied by reading the data from the quickly accessible cache memory rather than from the much slower electromechanical disk drives. Various elaborate mechanisms are employed to maintain, within the cache memory 307, data that has the greatest chance of being subsequently re-requested within a reasonable amount of time. The disk array controller 306 may also elect to store data received from remote computers via WRITE requests in cache memory 307 in the event that the data may be subsequently requested via READ requests or in order to defer slower writing of the data to physical storage medium.

Electronic data is stored within a disk array at specific addressable locations. Because a disk array may contain many different individual disk drives, the address space represented by a disk array is immense, generally many thousands of gigabytes. The overall address space is normally partitioned among a number of abstract data storage resources called logical units ("LUNs"). A LUN includes a defined amount of electronic data storage space, mapped to the data storage space of one or more disk drives within the disk array, and may be associated with various logical parameters including access privileges, backup frequencies, and mirror coordination with one or more LUNs. LUNs may also be based on random access memory ("RAM"), mass storage devices other than hard disks, or combinations of memory, hard disks, and/or other types of mass storage devices. Remote computers generally access data within a disk array through one of the many abstract LUNs 308–315 provided by the disk array via internal disk drives 303–305 and the disk array controller 306. Thus, a remote computer may specify a particular unit quantity of data, such as a byte, word, or block, using a bus communications media address corresponding to a disk array, a LUN specifier, normally a 64-bit integer, and a 32-bit, 64-bit, or 128-bit data address that specifies a LUN, and a data address within the logical data address partition allocated to the LUN. The disk array controller translates such a data specification into an indication of a particular disk drive within the disk array and a logical data address within the disk drive. A disk drive controller within the disk drive finally translates the logical address to a physical medium address. Normally, electronic data is read and written as one or more blocks of contiguous 32-bit or 64-bit computer words, the exact details of the granularity of access depending on the hardware and firmware capabilities within the disk array and individual disk drives as well as the operating system of the remote computers generating I/O requests and characteristics of the communication medium interconnecting the disk array with the remote computers.

While the disk array, as described above, provides data storage within, and addressed relative to, LUNs, high-level application programs ("APPs") executing on host computers access data stored within LUNs via a number of higher-level abstractions. FIG. 4 illustrates the hierarchical data abstraction levels within a host computer/disk array system. Each block in FIG. 4 represents a separate program, program/hardware, or hardware component within the host computer/disk array system. As discussed above, the disk array 402 accesses data stored within internal disks via internal physical addresses that each contain indications of a disk, a track within a disk, a sector within the track, and a byte within the sector. However, as discussed above, the disk array provides data access and storage to virtual storage spaces, called LUNs, each LUN having some fixed number of addressable units, such as bytes. The two abstractions 404 and 406 in FIG. 4 are linked to operating system components that execute within the operating system of a host computer interconnected with a disk array. The first component is a volume manager 404. This component interacts with a disk array via a communications medium, accessing and storing data relative to the LUN abstraction provided by the disk array. The volume manager 404 presents a different interface to components above the volume manager in the abstraction hierarchy. The volume manager provides volumes which have volume names and which contain a linear address space of bytes, words, or some other convenient addressable entity. The volume manager may map a volume onto one or more LUNs, translating volume-relative addresses received from higher-level components into LUN-based data addresses that the volume manager then passes to the disk array. In addition, the volume manager can increase the size of a logical volume using an arbitrary LUN, which can quickly change the physical location of the entirety of a logical object.

The next highest component shown in FIG. 4 is the operating system's file manager 406. The file manager provides a logical object interface to the highest-level component, an executing APP 408. Most logical objects currently provided by file managers and used by APPs are called "files." Files are arbitrarily sized, consecutive sequences of data bytes, described by file names, that are stored on a mass storage device and read from, and written to, operating-system-provided I/O commands. A file manager provides a hierarchical, multi-component file name space to allow an APP or user to organize files within hierarchical directories. The file manager translates a file name, including the directory and subdirectory prefixes within the file name, to a range of consecutive addressable entities, such as bytes, within a volume. An APP 408, or a human user interacting with the APP, stores data to, and accesses data from, a mass storage device, such as a disk array, in terms of named logical objects.

Normally, a human user or APP is not concerned with the actual physical location of logical objects. Logical objects may, for example, span a number of different LUNs, each of which span a number of different hard disk drives within a disk array. There are, however, cases where a human user or APP may be very concerned about the physical locations of data stored within logical objects. In many systems, logical objects are replicated in order to provide greater reliability. If the storage medium on which a first logical object is stored becomes corrupted, then the second logical object, a copy of the first logical object, can be accessed instead. However, if both logical objects, or portions of the logical objects, are stored on the same hard disk drive, a single hard disk drive failure may destroy both logical objects and may therefore constitute an unrecoverable error. No matter how many copies of a logical object are saved, because portions of the logical objects may end up residing on a common disk drive, a user or application program may not be guaranteed of being able to recover a single good copy of the logical object following a hard disk drive failure. Of course, a user or APP may direct copies of the logical objects to be stored on different disk arrays or other types of mass storage devices. However, there may be additional virtual address layers between disk drives and a host computer, so that an APP or user may not, in fact, be able to determine from a logical object name on which mass storage device the logical object resides.

Various utilities and support functionality within operating systems and disk array controllers have been developed in order to facilitate translation of logical object names to physical storage locations. FIG. 5 graphically represents two translation mechanisms that facilitate translation of logical object names to physical storage locations. Within a disk array controller 502, a LUN Manager, or LUN Manager functionality, may translate a LUN into one or more physical extents, each physical extent comprising a starting point and ending point on a hard disk drive, each extent expressed as indications of a disk, a track within the disk, and a sector within the track. The LUN Manager 504, in addition to providing LUN to physical location translations, can also forcibly relocate a first LUN to different hard disks within the disk array so that the first LUN does not overlap a second LUN, or, in other words, so that no data of the first LUN is stored on a hard disk that stores data of the second LUN. When data of a first LUN is stored on a disk which contains data of a second LUN, then the two LUNs are said to overlap. Thus, the forcible relocation functionality provided by the LUN Manager 504 ensures that two LUNs do not overlap.

Within operating systems or within an application directly above the operating system, of host computers, an executable routine or component "ResolveObject" 506 has been developed to translate a logical object name 508 into one or more LUNs 510 on which the object is stored in a mass storage device. ResolveObject interacts with the file manager and volume manager, or with shared data structures employed by the file manager and volume manager, to translate logical object names into a list of LUNs. Both ResolveObject 506 and LUN Manager 504 provide necessary pieces of a logical-object-name-to-physical-location translation mechanism required by certain human users and APPs running on host computers. However, these separate functionalities are not currently linked, and it is difficult or impossible for a human user or APP to first use ResolveObject to translate a logical object name to a list of LUNs and then to directly access functionality provided by the LUN Manager 504 on a remote disk array 502 to obtain a physical translation of a logical object name and to employ the forced-move functionality provided by the LUN Manager in order to separate the set of LUNs that together compose a first logical object from the set of LUNs that together compose a second logical object so that the first logical object does not overlap the second logical object.

Thus, computer users, application program developers, database managers, database designers, and computer and mass storage device designers and manufacturers have all recognized the need for direct, easy-to-use logical object translation and logical object separation mechanisms that can be employed by human users and APPs to determine the physical locations of logical objects and to force and monitor separation of logical objects.

SUMMARY OF THE INVENTION

One embodiment of the present invention provides logical object to physical location translation to human users and APPs for logical objects stored on mass storage devices. In addition, this embodiment of the present invention provides tools with which a human user or APPs may separate two logical objects so that the two logical objects do not overlap on physical storage media and tools that allow a human user or APP to monitor the resulting separation of logical objects to detect subsequent re-overlap of the logical objects. This embodiment of the present invention makes use of already existing object resolution and LUN Manager functionalities developed for host computers and mass storage devices, respectively. This embodiment provides new interfaces to the object resolution and LUN Manager components, and provides direct interaction between these new interfaces.

DETAILED DESCRIPTION OF THE INVENTION

The present invention is related to determination of the physical location and control of the physical location of logical objects within mass storage devices. As described above, a logical object represents many levels of abstraction above the physical storage of data comprising the logical object on a mass storage device. Generally, the physical location or locations of a logical object is of little or no concern to computer users and APPs. However, in certain cases, including cases in which a logical object needs to be replicated so that loss of one copy of the logical object does not result in unrecoverable loss of the data within the logical object, the physical location or locations of a logical object are of great and immediate concern to a human user or APP. As discussed above, with reference to FIG. 5, the ResolveObject functionality 506 developed for host computers 505 and the LUN Manager functionality 504 developed for a particular type of mass storage device, the disk array 502, both provide portions of the functionality required for logical object name translation and logical object separation. However, as discussed with reference to FIG. 5, the ResolveObject and LUN Manager components are not currently interfaced with one another, and it is difficult or impossible for human users and APPs to employ the LUN Manager functionality following logical objects name resolution in order to obtain logical-object-physical-location translations and in order to separate logical objects so that the logical objects do not overlap within a mass storage device. Even if the physical location of a logical object could be obtained by a human users or an APP, there is no guarantee that, because of subtle changes, such as logical volume expansion or striping, the obtained physical location is valid at a subsequent point in time when the human users or APP attempts to use the obtained physical location.

Figure 1:
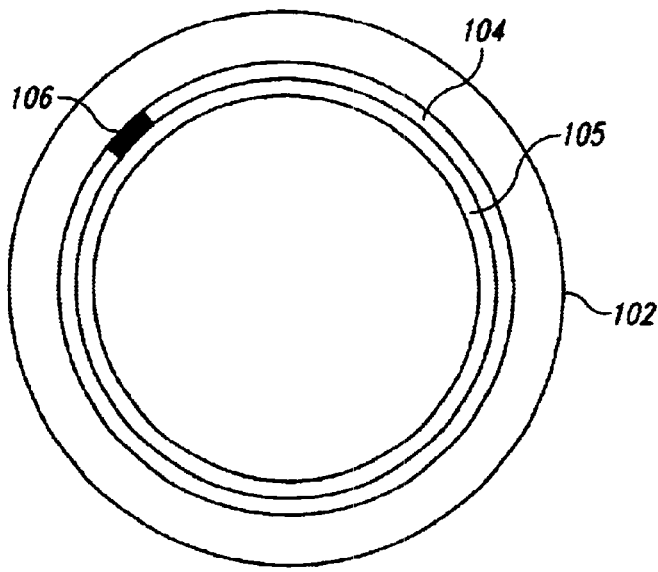
FIG. 1 illustrates data storage within a platter of a hard disk drive.
Figure 2:
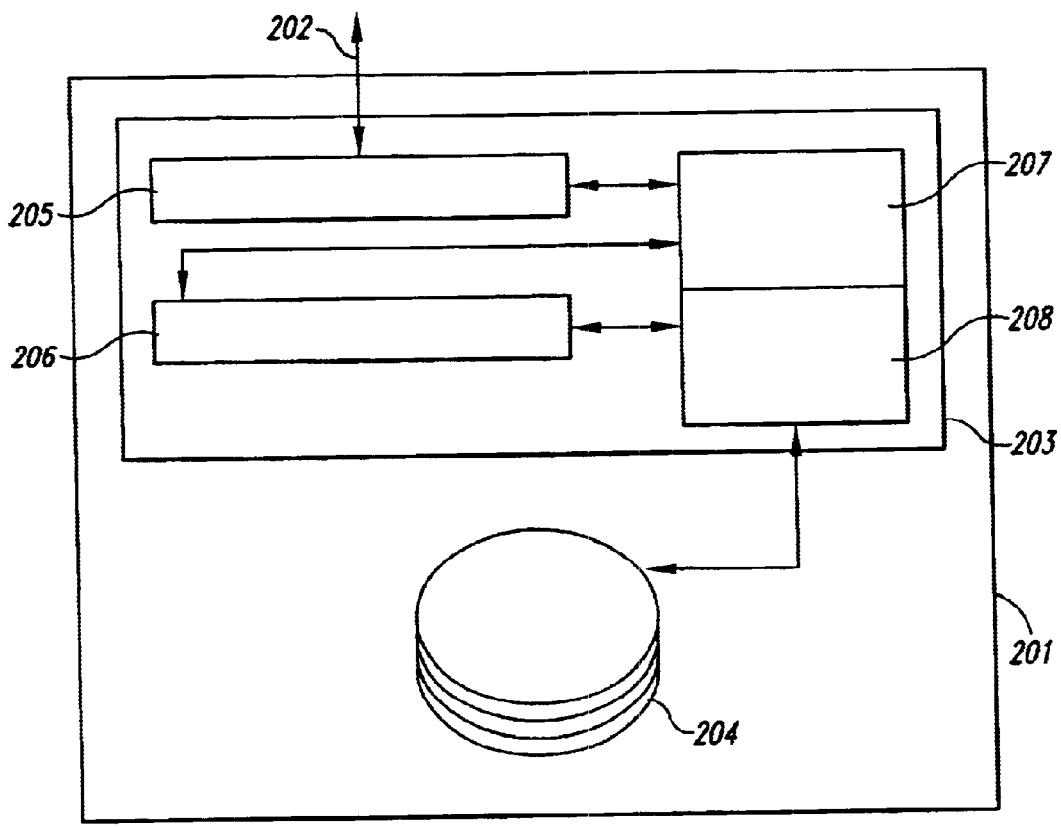
FIG. 2 is a block diagram of a standard disk drive.
Figure 3:
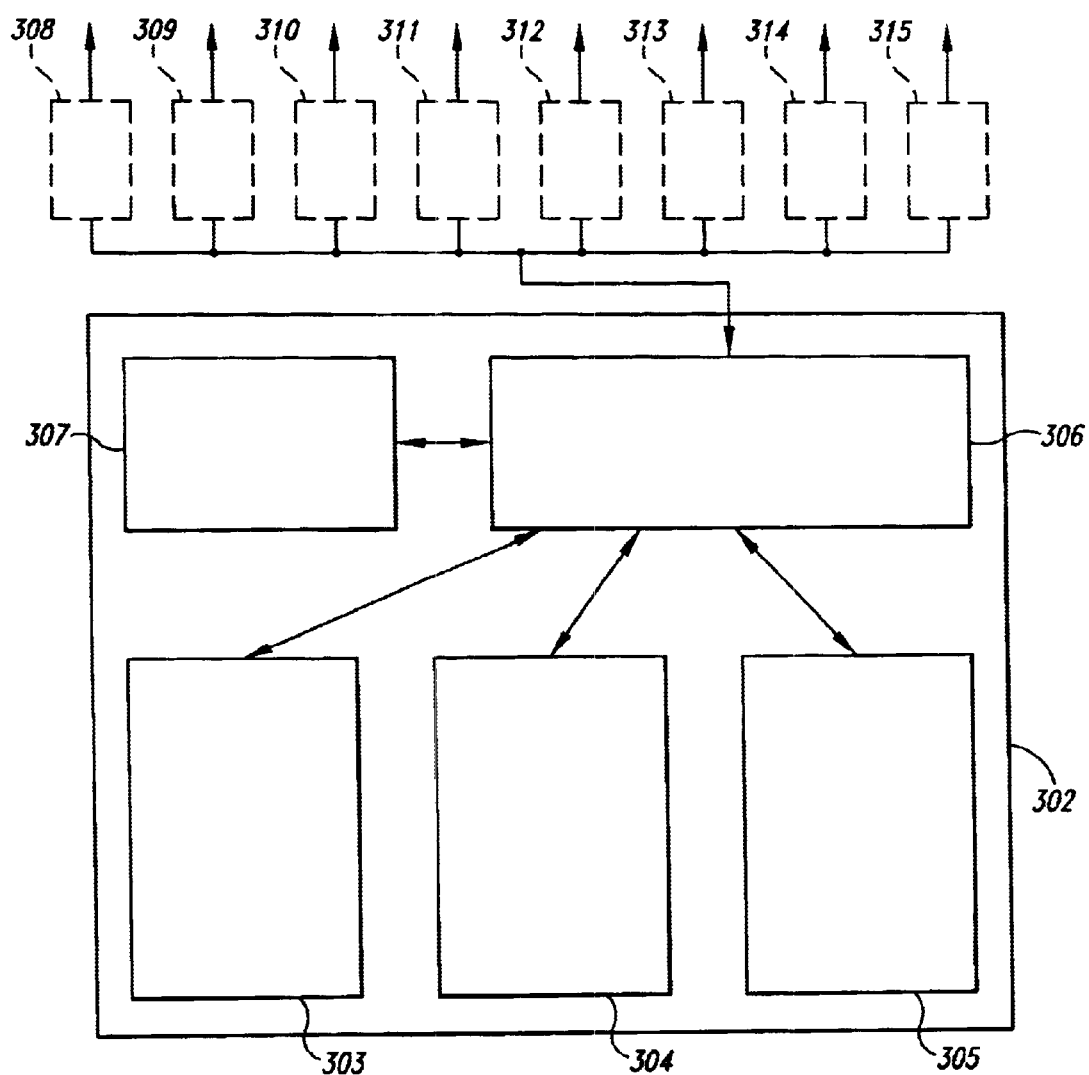
FIG. 3 is a simple block diagram of a disk array.
Figure 4:
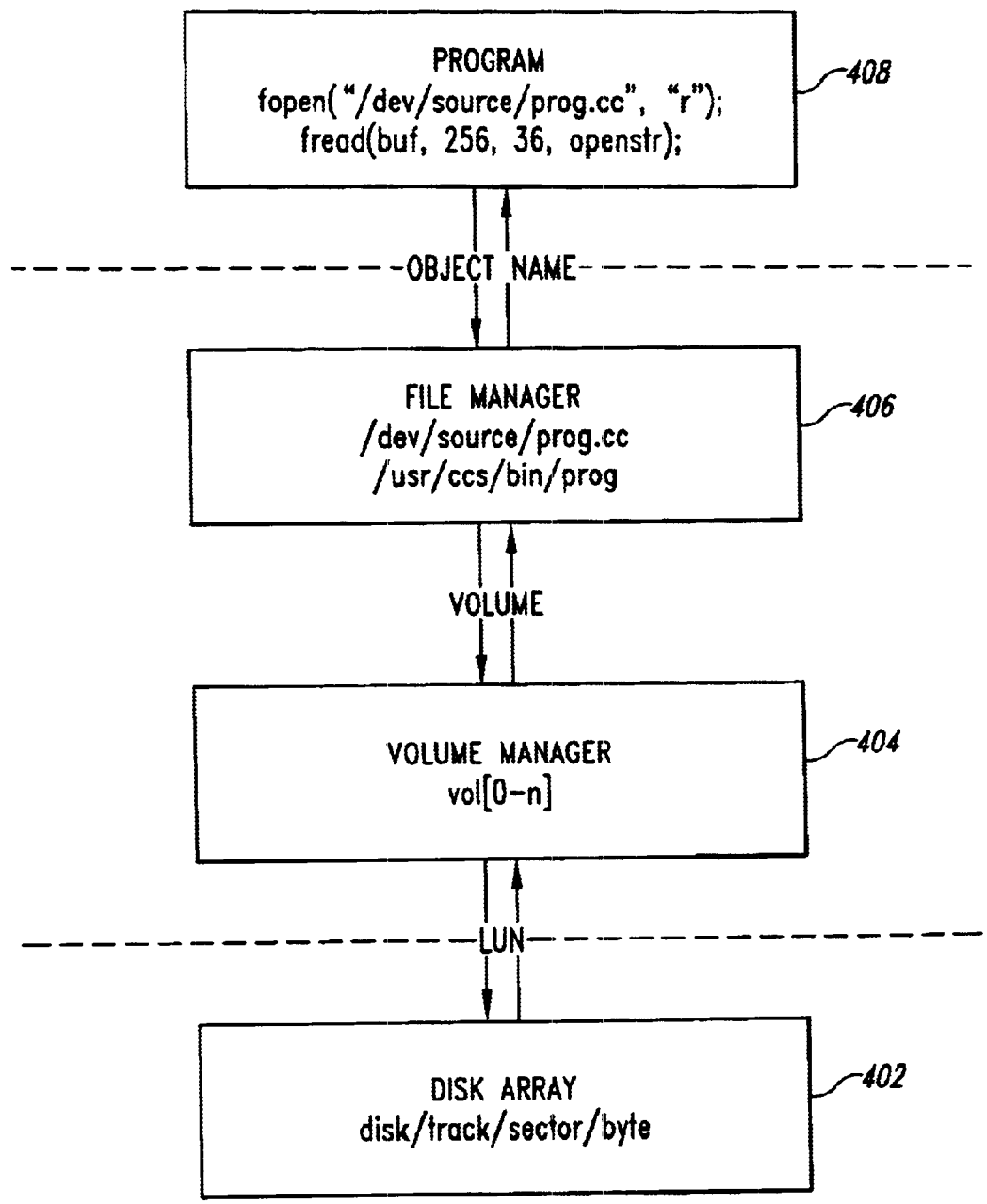
FIG. 4 illustrates a number of components within a host computer/disk array system.
Figure 5:
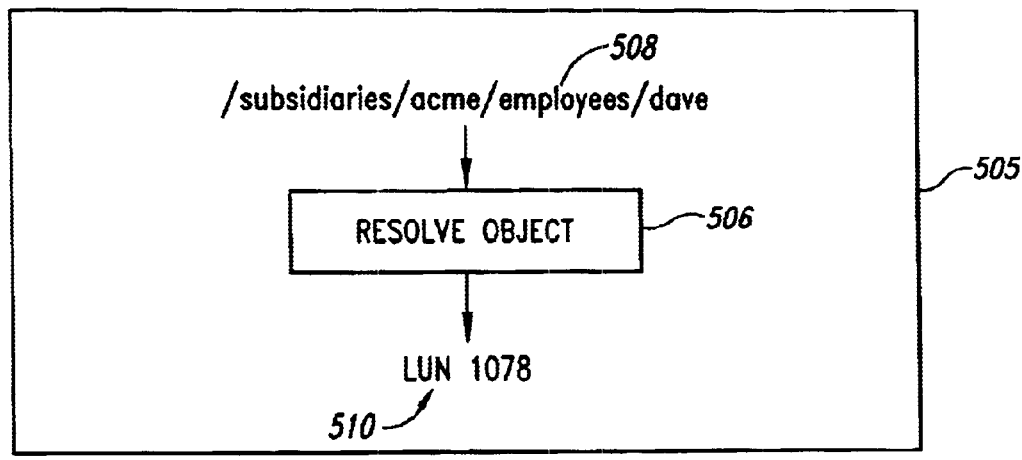
FIG. 5 graphically represents two translation mechanisms that facilitate translation of logical object names to physical storage locations.
Figure 5:
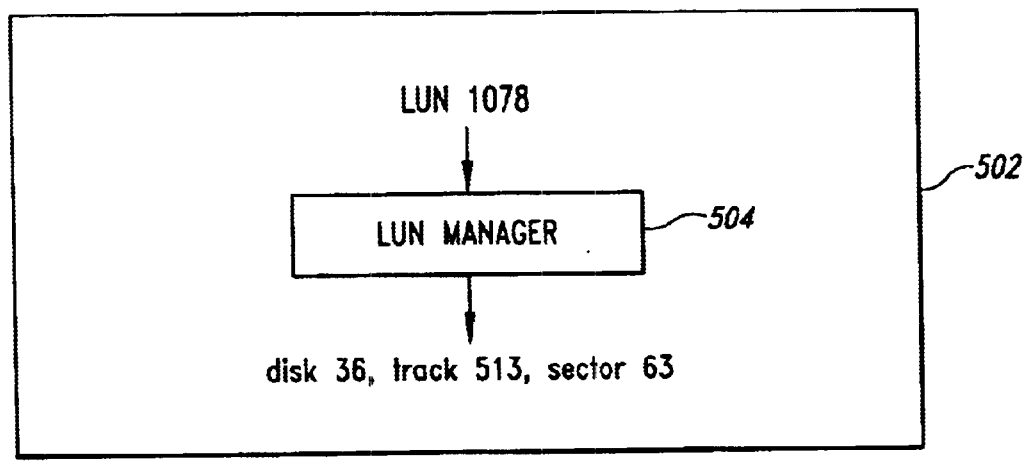
Figure 6:
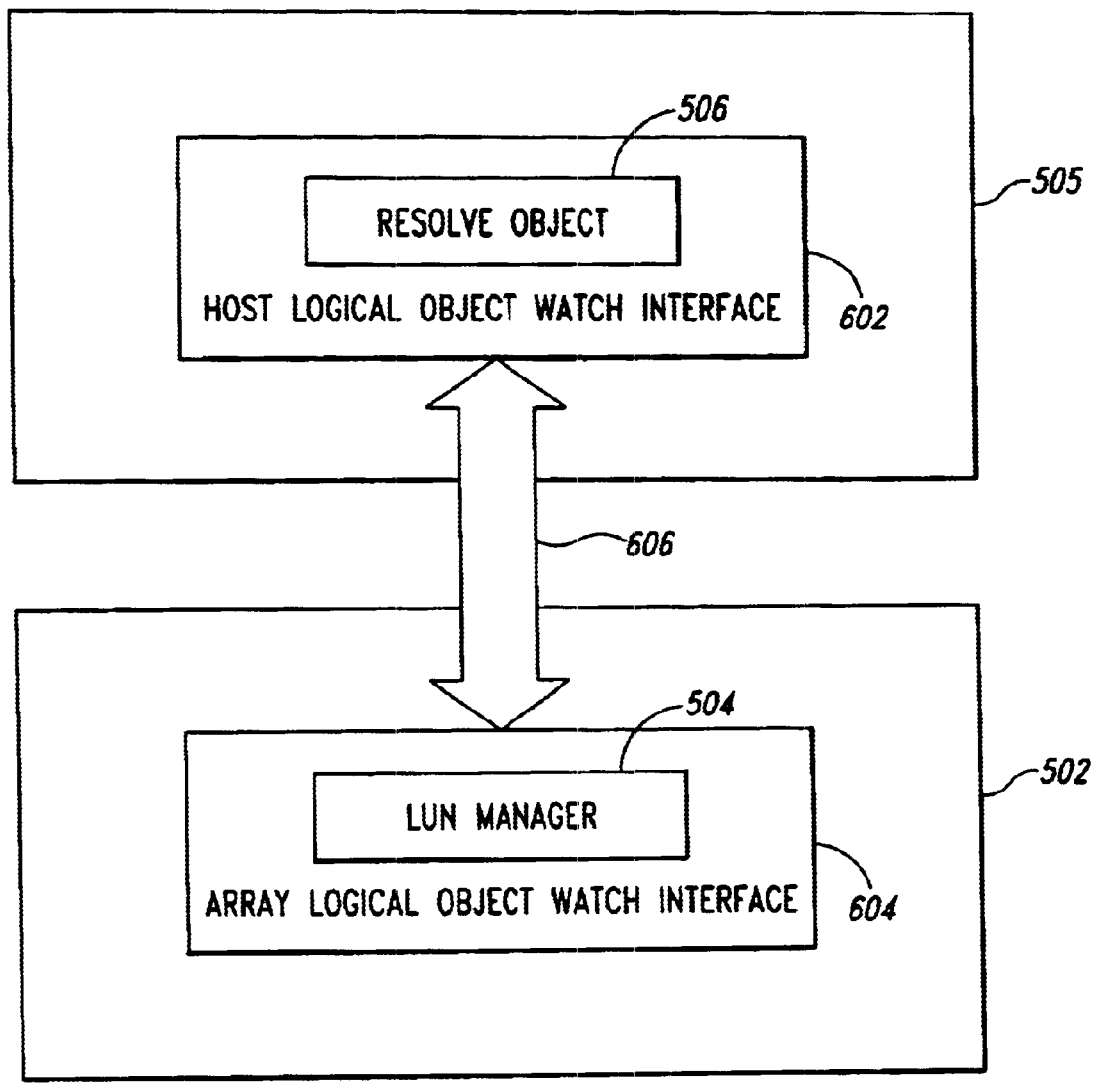
FIG. 6 illustrates the relationship between one embodiment of the present invention and the ResolveObject and LUN Manager functionality illustrated in FIG. 5.

FIG. 6 illustrates the relationship between one embodiment of the present invention and the ResolveObject and LUN Manager functionality illustrated in FIG. 5. In order to interface ResolveObject functionality with functionality provided by the LUN Manager, represented in FIG. 6 by double-headed arrow 606, a host logical object watch interface ("HLOWI") 602 is provided that, in turn, provides a high-level functional interface to an array logical object watch interface ("ALOWI") 604 within a disk array controller. Because the HLOWI interfaces to the ALOWI, the HLOWI can provide a functional interface to human users and to APPs that may draw on both ResolveObject functionality and LUN Manager functionality to carry out tasks specified by calling functions of the functional interface. Details of the functional interface are discussed below.

Note that the ALOWI component of the present invention may be implemented within a software program or routine running on a processor implementing a disk array controller, or controller in some other type of mass storage device, within a firmware implementation of a controller, or directly within logic circuits. The HLOWI component of the present invention may be implemented as a software program or collection of software routines within or above the operating system of a host computer. The HLOWI functionality may be implemented, in the future, in devices, other than computers, that are interconnected with, and that provide access to, mass storage devices such as disk arrays. C++-like pseudocode and flow control diagrams are provided below to illustrate one possible implementation of the present invention, but the C++-like pseudocode and flow control diagrams are not intended, in any way, to limit the present invention to a particular type or style of implementation.

Figure 7:
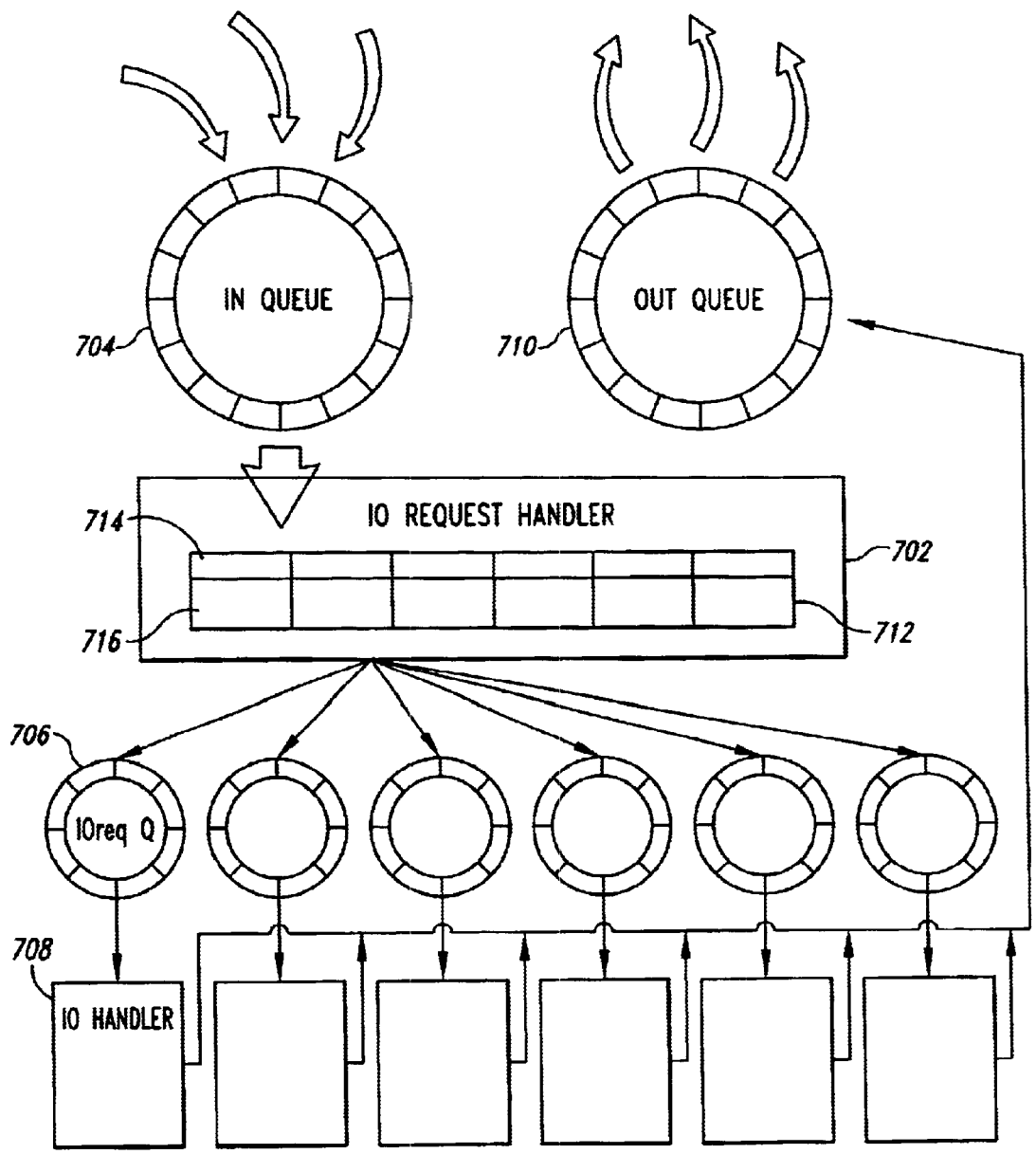
FIG. 7 illustrates the overall organization and particular features of a C++-like pseudocode implementation of a portion of one embodiment of the present invention.

Several embodiments of the present invention are discussed, below, with reference to a C++-like pseudocode implementation of a portion of a disk array controller. FIG. 7 illustrates the overall organization and particular features of this C++-like pseudocode. The C++-like pseudocode includes several routines. The routine "IORequestHandler" 702 represents high-level processing by the disk array controller. This routine receives I/O requests from remote computers via an inbound queue "inQueue" 704 and distributes received I/O requests to intermediary queues, called "IOreqQs" (for example, IOreqQ 706 in FIG. 7) associated with each LUN. For each LUN, a separate asynchronously executing thread executes the routine "IOHandler" (for example, IOHandler thread 708 in FIG. 7) that receives I/O requests from the intermediary queue associated with the thread, processes the I/O requests, and returns status and, in the case of a READ request, data to an outgoing queue "outQueue" 710.

Note that the following C++-like pseudocode does not attempt to illustrate or describe all of the various functionality of a disk array controller, but only that functionality related to the present invention. The following C++-like pseudocode is provided for illustration of an embodiment of the present invention.

First, a number of enumerations and constants are provided, followed by a number of class declarations. Many of these classes contain no member functions, because no additional detail is necessary for the subsequent routine descriptions. In essence, they are stubs, or place holders, representing additional potential functionality that is unnecessary for description of the present invention. Other of the classes contain minimal member functions sufficient for description of the present invention. Note, however, that the C++-like pseudocode used to describe the present invention can be easily transformed into working C++ code by including member functions not provided in the C++-like pseudocode and by implementing the member functions. In the C++-like pseudocode, implementations of routines are only provided when necessary to describe the present invention.

The C++-like pseudocode illustrates a possible implementation of the ALOWI component of one embodiment of the present invention within a disk array controller. A logical object may, in certain cases, span multiple disk arrays or other mass storage devices. In cases where logical objects may span multiple mass storage devices, such as multiple disk arrays, the ALOWI interface may be provided in a distributed fashion by one or more of the mass storage devices or by some intermediate device or computer. A distributed ALOWI requires more complex functionality and interconnection, but can be interfaced to an HLOWI, according to the present invention, in similar fashion to interfacing of a LUN Manager within a single mass storage device to an HLOWI.

```
1  enum IOCommand {READ, WRITE, WATCH,
      REARRANGE, MOVE, TRANSLATE};
2  enum IOstatus {SUCCESS, QUEUED, FAILURE};
3  enum IOReplyTp {WATCH_REPLY, REARRANGE_
      REPLY, MOVE_REPLY};
4  const int NULL=0;
5  const int LUNno=4096;
```

The values of the enumeration "IOCommand" on line 1, above, represent the basic I/O commands READ and WRITE, as well as commands directed to the ALOWI that provide logical-object-name translation and logical-object separation and rearrangement. These commands will be discussed, in detail, below. The values of the enumeration "lostatus," on line 2, above, indicate an outcome following execution of an I/O command. The status "QUEUED" indicates that an I/O command has resulted in launching or scheduling for launch of an asynchronous process that will complete at a later time. The values of the enumeration "IOReplyTp," on line 3, above, indicate the type of IOReply returned from the ALOWI to the HLOWI. Note that this list is not complete, but only includes values necessary for implementation of the portions of the ALOWI shown in the C++-like pseudocode implementation. The constant "NULL" is defined to indicate null pointers. The constant "LUNno" is defined to represent the maximum number of LUNs that can be provided by a disk array, and is arbitrarily set to the constant value 4096 in the pseudocode.

```
1  class time
2  {
3  public:
4      bool operator==(time);
5  };
```

An instance of the class "time," defined above, represents a particular time returned, for example, by a call to a system function that returns the current system time. The class "time" may include a number of operator members that allow for comparison of times, subtraction of times, addition of times, and addition of an integer representing some number of units of time, such as seconds, to an instance of the class "time." Only one operator is shown, above.

```
1   class hostID
2   {
3
4   };
1   class arrayID
2   {
3
4   };
1   class IOaddress
2   {
3
4   };
1   class buffAddress
2   {
3   public:
4   };
```

An instance of the class "hostID" represents a unique identifier and address for a host computer. An instance of the class "arrayID" represents the address of a disk array, in the current embodiment. Other types of addresses are necessary when the ALOWI resides on another type of mass storage device or on an intermediate computer. An instance of the class "IOaddress" represents the address of electronic data specified in an I/O request for READ or WRITE access. The class "buffAddress" represents the address of a buffer that stores electronic data for transfer between remote computers and the disk array controller.

```
1   class IO_LUN
2   {
3   public:
4       int getLUN();
5
6   };
1   class IO_LUNs
2   {
3   public:
4       IO_LUN* getFirst();
5       IO_LUN* getNext();
6   };
1   class LUNlist
2   {
3   public:
4       int getFirstLUN();
5       int getNextLUN();
6       void setFirstLUN(int);
7       void setNextLUN(int);
8       void clear();
9   };
```

An instance of the class "IO_LUN" represents a particular LUN provided by a disk array. The class "I/O_LUN" includes a member function "getLUN" that returns an integer uniquely identifying the LUN described by an intance of I/O_LUN. An instance of the class "I/O_LUNs" represents the collection of LUNs provided by a disk array, and the member functions "getFirst" and "getNext" allow an instance of the class "I/O_LUN" to be retrieved from the collection for each LUN provided by a disk array.

An instance of the class "LUNlist" represents a list of integer specifiers of LUNs. The class "LUNlist" includes member functions "getFirstLUN" and "getNextLUN" to get the first integers specifying a LUN from the list and then traverse the remaining integers within the list, and includes analogous functions "setFirstLUN" and "setNextLUN" for inserting integers into the list. The class "LUNlist" includes an additional member function "clear" that clears all entries from the lists. Below, a number of other classes use the same list paradigm, and will not be described in great detail as they are entirely analogous with the member functions of the classes "I/O_LUNs" and "LUNlist."

```
1   class physicalMediumAddress
2   {
3   public:
4       int         getDisk();
5       int         getTrack();
6       int         getSector();
7       void        setDisk(int);
8       void        setTrack(int);
9       void        setSector(int);
10  };
1   class physicalMediumChunck
2   {
3   public:
4       physicalMediumAddress*    getStart();
5       physicalMediumAddress*    getEnd();
6       void                      setStart(physicalMediumAddress*);
7       void                      setEnd(physicalMediumAddress*);
8   };
1   class chunkList
2
3   public:
4       physicalMediumChunck*     getFirstChunk();
5       physicalMediumChunck*     getNextChunk();
6       void                      setFirstChunk(physicalMediumChunck*);
7       void                      setNextChunk(physicalMediumChunck*);
8       void                      clear();
9   };
1   class    physicalLunTranslation
2   {
3   public:
4       int              getLUN();
```

-continued

```
5      void           setLUN(int);
6      chunkList*     getPhysical();
7      void           setPhysical(chunkList*);
8   };
1   class physicalLunTransList
2   {
3      physicalLunTranslation*   getFirstLunTrans();
4      physicalLunTranslation*   getNextLunTrans();
5      void                      setFirstLunTrans(physicalLunTranslation*);
6      void                      setNextLunTrans(physicalLunTranslation*);
7      void                      clear();
8   };
```

An instance of the class "physicalMediumAddress" represents the address of a data entity, such as a byte or word, within a disk array. As described adove, a physical address includes an indication of a disk, a track within the disk, and a sector. The class "physicalMediumAddress" correspondingly includes member funtions for extracting and setting the disk, track, and sector indicators of a physical address.

An instance of the class "physicalMediumChunk" describes an extent of data stored within a disk array. An extent of data is a continuous sequence of data entities, such as bytes or words. An extent is characterized by a starting physical location and an ending physical location, and the class "physicalMediumChunk" correspondingly includes member functions for obtaining the start and ending physical address of the chunk and for setting the start and ending physical addresses for the chunk.

An instance of the class "chunkList" describes a set of physical extents, or chunks, and employs the same list paradigm as employed by the earlier described classes "IO_LUNs" and "LUNlist." An instance of the class "physicalLunTranslation" describes the translation of a LUN into a list of physical extents, and therefore includes member functions to get and set the LUN, where the LUN is indicated by an integer, and member functions to get and set the physical-location descriptions of the extents contained within an instance of the class "chunkList." An instance of the class "physicalLunTransList" is a list of instances of the class "physicalLunTranslation." An instance of the class "physicalLunTransList" contains member functions that follow the paradigm described earlier for classes "IO_LUNs" and "LUNlists." A list of physical translations represented by an instance of the class "physicalLunTransList" may represent a proposed rearrangement of LUNs to alternative physical locations within a disk array.

```
1   class objectName
2   {
3   };
1   class      objectLunTranslation
2   {
3   public:
4      objectName*             getObject();
5      void                    setObject(objectName*);
6      physicalLunTranslation* getLunTrans();
7      void                    setLunTrans(physicalLun
                                Translation*);
8   };
1   class internalArrayMap
2   {
3   public:
4      bool                    valid(int LUN);
```

-continued

```
5      physicalLunTranslation*   getTrans(int LUN);
6      void                      setTrans(int LUN, physicalLun
                                  Translation* t);
7   };
```

An instance of the class "objectName" represents the name of a logical object. An instance of the class "objectLunTranslation" represents the translation of a logical object name to a physical location, and includes member functions to get and set the name of the logical object and member functions to get and set the physical translation corresponding to the logical object. An instance of the class "internalArrayMap" represents an internal map within the disk array that maps the LUNs provided by the disk array to physical locations within a disk array. The class "internalArrayMap" includes the following member functions: (1) "valid," a member function that returns a Boolean value indicating whether or not an integer designating a LUN, provided as an argument, specifies a valid LUN; (2) "getTrans," a member function that provides the physical translation for a LUN specified by an integer provided as an argument; and (3) "setTrans," a member function that enters a physical mapping of a LUN into the internal array map.

```
1    class IOrequest
2    {
3    public:
4       hostID*       getHostID();
5       void          setHostID(hostID*);
6       arrayID*      getArrayID(arrayID*);
7       void          setArrayID();
8       IOCommand     getIOCommand();
9       void          setIOCommand(IOCommand);
10      int           getID();
11      void          setID(int);
12   };
1    class DataRequest:public IOrequest
2    {
3    public:
4       int           getLUN();
5       void          setLUN(int);
6       IOaddress     getIOaddress();
7       void          setIOaddress();
8       buffAddress   getBuffAddress();
9       void          setBuffAddress(buffAddress);
10      int           getLength();
11      void          setLength(int);
12   };
1    class WatchRequest:public IOrequest
2    {
3    public:
4       LUNlist*      getLUNlist();
```

-continued

```
5      void            setLUNlist(LUNlist*);
6      int             getInterval();
7      void            setInterval();
8   };
1   class RearrangeRequest:public IOrequest
2   {
3   public:
4       physicalLunTransList*  getTransList();
5       void            setTransList (physicalLunTransList*);
6       time            getWhen();
7       void            setWhen(time t);
8       time            getBy();
8       void            setBy();
9   };
1   class MoveLunRequest:public IOrequest
2   {
3   public:
4       physicalLunTranslation*  getTrans();
5       void            setTrans(physicalLunTranslation*);
6   };
1   class TranslateRequest:public IOrequest
2   {
3   public:
4       int             getLUN();
5       void            setLUN(int);
6   };
1   class IORequestQueue
2   {
3   public:
4       IOrequest*      getNext();
5       void            queue(IOrequest*);
6       hostID          getHeadHost();
7       bool            empty();
8       bool            terminated();
9       void            terminate();
10  };
1   class IORequestQueueArray
2   {
3   public:
4       IORequestQueue* getQ(int);
5   };
```

The class "IOrequest" encapsulates the various data that together compose an I/O request received by a disk array controller from a remote computer and that is serviced by the disk array controller. The class "IOrequest" includes the following member functions: (1) "getHostID," a function that returns a pointer to an object of the class "HostID" that represents the remote computer that generated the I/O request represented by the current instance of the class "IOrequest;" (2) "setHostID," a member function that sets the host ID of the I/O request represented by the current instance of the class "IOrequest" to the host ID pointed to by the supplied pointer argument; (3) "getArrayID," a member function that returns an address of a disk array to which the I/O request is directed; (4) "setArrayID," a member functions that sets an instance of the class "IOrequest" to be directed to a particular disk array addressed by the address provided as an argument; (5) "getIOCommand," a member function that returns one of the values enumerated in the enumeration "IOCommand" indicating the nature of the I/O request; (6) "setIOCommand," a member function that sets the I/O request to have a type equal to one of the values enumerated in the enumeration "IOCommand" to indicate the nature of the I/O request; (7) "getID," a member function that returns a unique ID identifying an instance of the class "IOrequest;" and (8) "setID," a member function that sets the unique ID identifying the IOrequest.

The C++-like pseudocode implementation employs a number of request classes derived from the above-described class "IOrequest." These derived request classes represent particular types of I/O requests. The first derived request class, "DataRequest," represents a standard READ or WRITE I/O command, and includes the following member functions: (1) "getLUN," a member function that returns the LUN to which the I/O request is addressed; (2) "setLUN," a member function that sets the LUN to which the I/O request is addressed; (3) "getIOaddress," a member function that returns the address of the first electronic data to which the I/O request is targeted; (4) "setIOaddress," a member function that sets the address of the first electronic data to which the I/O request is targeted; (5) "getBuffAddress," a member function that returns the address of the buffer that contains data for a WRITE operation or into which data is placed for a READ operation; (6) "setBuffAddress," a member function that sets the address of a buffer that contains data for a WRITE operation or into which data is placed for a READ operation; (7) "getLength," a member function that returns the length, or number of contiguous bytes, words, or blocks of data to be read or written during servicing of the I/O request; and (8) "setLength," a member function that sets the length, or number of contiguous bytes, words, or blocks of data to be read or written during servicing of the I/O request.

The next four derived request classes constitute the interface of the ALOWI. These four derived classes stand for the commands, or functions, WATCH, REARRANGE, MOVELUN, AND TRANSLATE. A WATCH command, represented by an instance of the class "WatchRequest," instructs the ALOWI to monitor READ and WRITE activity directed towards LUNs provided within the WATCH command in a list of LUNs for an interval of time provided in the WATCH command as an integer. After monitoring the disk activity directed to the LUNs within the list of LUNs, the ALOWI furnishes, in response to the WATCH command, a proposed physical relocation of some or all of the LUNs in order to optimize disk activity associated with the LUNs. For example, monitoring of the LUNs may determine that greater parallelism can be achieved by separating the LUNs on separate physical disks. In other cases, if access to LUNs appears to be more or less regularly interleaved, the LUNs may be correspondingly interleaved on a single physical disk in order to minimize seek operations within the hard disk drives. An instance of the class "WatchRequest" includes the following member functions: (1) "getLUNlist," a member function that returns a pointer to the list of LUNs included in the WatchRequest; (2) "setLUNlist," a member function that sets the list of LUNs to be watched during execution of the WatchRequest; (3) "getInterval," a member function that extracts from a WatchRequest the time interval during which monitoring should occur; and (4) "setInterval," a member function that sets the time interval for monitoring.

An instance of the class "RearrangeRequest" represents a rearrange command that rearranges LUNs within a disk array according to a supplied list of translations of LUNs to sets of physical extents. These sets of physical extents are returned b a disk array controller in response to a WATCH command. Thus, in order to achieve disk array optimization, a WATCH command is directed to the disk array to obtain a proposed list of physical translations represented proposed relocations of LUNs, and that proposed list of changes is supplied to the disk array in a REARRANGE command in order to cause the disk array to remap the LUNs according to the proposed physical translations. An instance of the class "RearrangeRequest" therefore contains the following member functions: (1) "getTransList," a member function that returns a list of proposed locations of LUNs; (2) "setTransList," a member function that sets the request rearrangement to a proposed list of physical translations pointed to by the supplied pointer argument; (3) "getWhen," a member function that returns a time indicating when the rearrangement should begin; (4) "setWhen," a member function that sets the time at which rearrangement should begin for a particular REARRANGE request; (5) "getBy," a member function that returns a time interval during which the rearrangement should occur; and (6) "setBy," a member function that sets the time interval during which the arrangement should occur.

An instance of the class "MoveLunRequest" represents a MOVELUN command that directs a disk array to move or relocate a LUN such that the LUN does not overlap any of the disks that include a physical extent specified in an accompanying physical translation. The class "MoveLunRequest" therefore includes member functions to extract and to set a physical LUN translation to indicate both a LUN to relocate and a physical translation away from which the LUN should be relocated. A MOVELUN command is essentially a forced move or forced relation request can be used to physically separate a first LUN from a second LUN. Note that the physical LUN translation included in the MOVELUN request does not represent the physical translation of a LUN, but instead represents the combination of a LUN to forcibly relocate and the physical translation of a second LUN away from which the LUN should be physically relocated.

An instance of the class "TranslateRequest" represents a translate command that directs the ALOWI to provide a physical translation of the LUN included in the TranslateRequest. An instance of the class "TranslateRequest" includes member functions to get and set an indication of LUN to which the physical translation is requested.

An instance of the class "IORequestQueue" serves as the inQueue (702 in FIG. 7). The class "IORequestQueue" contains the following member functions: (1) "getNext," a member function that dequeues and returns a pointer to the next I/O request on the queue; (2) "queue," a member function that queues an I/O request, pointed to by the single argument, to the queue; (3) "getHeadHost," a member function that returns the hostID from the next I/O request within the queue to be dequeued from the I/O request queue; (4) "empty," a member function that returns a Boolean value indicating whether or not the I/O request queue is empty; (5) "terminated," a member function that returns a Boolean value indicating whether or not the I/O request queue has been terminated, or shut down; and (6) "terminate," a member function that shuts down, or terminates, the I/O request queue.

An instance of the class "IORequestQueueArray" maintains a buffer of instances of the class "IORequestQueue" described above. These instances of the class "IORequestQueue" correspond to the IOreqQs (for example, IOreqQ 703 in FIG. 7) associated with threads executing the routine "IOHandler."

```
1    class IOreply
2    {
3    public:
4        hostID*         getHostID();
5        void            setHostID(hostID*);
6        arrayID*        getArrayID();
7        void            setArrayID(arrayID*);
8        IOReplyTp       getIOReplyTp();
9        void            setIOReplyTp(IOReplyTp);
10       IOstatus        getIOStatus();
```

-continued

```
11       void            setIOStatus(IOstatus);
12       int             getID();
13       void            setID(int);
14   };
1    class DataReply:public IOreply
2    {
3    public:
4        int             getLUN();
5        void            setLUN(int);
6        IOaddress       getIOaddress();
7        void            setIOaddress();
8        buffAddress     getBuffAddress();
9        void            setBuffAddress(buffAddress);
10       int             getLength();
11       void            setLength(int);
12   };
1    class WatchReply:public IOreply
2    {
3    public:
4        physicalLunTransList*  getTransList();
5        void                   setTransList (physicalLunTrans
                                              List*);
6    };
1    class RearrangeOrMoveReply:public IOreply
2    {
3
4    };
1    class TranslateReply:public IOreply
2    {
3    public:
4        physicalLunTranslation*  getTransList();
5        void                     setTransList (physicalLunTranslation*);
6    };
1    class IOReplyQueue
2    {
3    public:
4        IOreply*        getNext();
5        void            queue(IOreply*);
6        hostID          getHeadHost();
7        bool            empty();
8        bool            terminated();
9        void            terminate();
10   };
```

An instance of the class "IOreply" represents a reply to an IO command from the disk array back to a host computer. The class "IOreply" includes many of the same member functions included in the class "IOrequest." However, a reply message represented by an instance of the class "IOreply" includes member functions to retrieve and set a reply type rather than the corresponding member functions in the class "IOrequest" that retrieve and set an IO command. The class "IOreply" includes two additional member functions that retrieve and set an IO status that represents the outcome of an IO command executed by the disk array controller.

The class "DataReply" represents a reply to a READ or WRITE I/O command, and contains member functions equivalent to those contained in the class "DataRequest." An instance of the class "WatchReply" represents a reply from the disk array controller to a host computer WATCH command, and includes member functions to retrieve and set the physical LUN translation list included in the reply that represents a proposed relocation of one or more LUNs. An instance of the class "RearrangeOrMoveReply" represents the reply from the disk controller to a host computer to deliver a REARRANGE command or a MOVELUN command. In both cases, the status indication in the base class "IOreply" is sufficient to convey needed information from the disk controller back to the host computer. The class "TranslateReply" represents the reply to a TRANSLATE command from the disk controller to the host computer, and includes member functions to retrieve and set a physical translation list that represents the physical translation determined for the LUN specified the TRANSLATE command. Finally, the class "IOReplyQueue" is analogous to the class "IORequestQueue" and is used, for example, for the outQueue (710 in FIG. 7) in the disk array controller.

The routine "IORequestHandler" (702 in FIG. 7) represents high-level processing carried out by the disk array controller in order to implement one embodiment of the present invention:

```
1    void IORequestHandler (IORequestQuueue* inQueue,
2                           IOReplyQueue* outQueue,
3                           internalArrayMap* map,
4                           IO_LUNs* iluns)
5    {
6        IOrequest*             iorequest;
7        int                    LUN;
8        IO_LUN*                ilun;
9        IORequestQueueArray    IOReqQs;
10       initialize(inQueue, outQueue);
11       ilun = iluns->getFirst();
12       while (ilun != NULL)
13       {
14           LUN = ilun->getLUN();
15           systemStartThread(IOhandler, IOReqQs.getQ(LUN), outQueue);
16           ilun = iluns->getNext();
17       }
18       while (!inQueue->terminated() && !outQueue->terminated())
19       {
20           if (inQueue->empty()) systemWaitOnQueueEvent(inQueue);
21           iorequest = inQueue->getNext();
22           if (iorequest->getIOCommand() == READ ||
23               iorequest->getIOCommand() == WRITE)
24           {
25               DataRequest* req = reinterpret_cast<DataRequest*> (iorequest);
26               LUN = req->getLUN();
27               IOReqQs.getQ(LUN)->queue(iorequest);
28           }
29           else if (iorequest->getIOCommand() == WATCH)
30           {
31               WatchRequest* req = reinterpret_cast<WatchRequest*>(iorequest);
32               WatchReply* rep = new WatchReply;
33               rep->setHostID(req->getHostID());
34               rep->setArrayID(req->getArrayID());
35               rep->setIOReplyTp(WATCH_REPLY);
36               rep->setID(req->getID());
37               systemStartThread(watch, req, rep, map, outQueue);
38               rep = new WatchReply;
39               rep->setHostID(req->getHostID());
40               rep->setArrayID(req->getArrayID());
41               rep->setIOReplyTp(WATCH_REPLY);
42               rep->setID(req->getID());
43               rep->setIOStatus(QUEUED);
44               outQueue->queue(rep);
45           }
46           else if (iorequest->getIOCommand() == REARRANGE)
47           {
48               RearrangeRequest* req =
49                   reinterpret_cast<RearrangeRequest*>(iorequest);
50               RearrangeOrMoveReply* rep = new RearrangeOrMoveReply;
51               rep->setHostID(req->getHostID());
52               rep->setArrayID(req->getArrayID());
53               rep->setIOReplyTp(REARRANGE_REPLY);
54               rep->setID(req->getID());
55               systemStartThread(rearrange, req, rep, map, outQueue);
56               rep = new RearrangeOrMoveReply;
57               rep->setHostID(req->getHostID());
58               rep->setArrayID(req->getArrayID());
59               rep->setIOReplyTp(REARRANGE_REPLY);
60               rep->setID(req->getID());
61               rep->setIOStatus(QUEUED);
62               outQueue->queue(rep);
63           }
64           else if (iorequest->getIOCommand() == MOVE)
65           {
66               MoveLunRequest* req =
67                   reinterpret_cast<MoveLunRequest*> (iorequest);
68               RearrangeOrMoveReply* rep = new RearrangeOrMoveReply;
69               rep->setHostID(req->getHostID());
70               rep->setArrayID(req->getArrayID());
```

```
-continued 71              rep->setIOReplyTp(MOVE_REPLY);
72              rep->setID(req->getID());
73              if (LunManager Move (getTrans(), map))
74                  rep->setIOStatus(SUCCESS);
75              else rep->setIOStatus(FAILURE);
76              outQueue->queue(rep);
77              delete req;
78          }
79          else if (iorequest->getIOCommand() == Translate)
80          {
81              TranslateRequest* req =
82                  reinterpret_cast<TranslateRequest*> (iorequest);
83              TranslateReply* rep = new TranslateReply;
84              rep->setHostID(req->getHostID());
85              rep->setArrayID(req->getArrayID());
86              rep->setIOReplyTp(MOVE_REPLY);
87              rep->setID(req->getID());
88              if (map->valid(req->getLUN()))
89              {
90                  rep->setTransList (map->getTrans(req->getLUN()));
91                  rep->setIOStatus(SUCCESS);
92              }
93              else rep->setIOStatus(FAILURE);
94              outQueue->queue(rep);
95              delete req;
96          }
97      }
98      if (!outQueue->terminated())
99      {
100         ilun = iluns->getFirst();
101             LUN = ilun->getLUN();
102             while (ilun = NULL)
103             {
104                 IOReqQs.getQ(LUN)->terminate();
105                 ilun = iluns->getNext();
106                 LUN = ilun->getLUN();
107             }
108     }
109 }
1   void watch (WatchRequest* req, WatchReply* rep,
2           internalArrayMap* map, IOReplyQueue* outQueue)
3   {
4       physicalLunTransList* tlist;
5       tlist = new physicalLunTransList;
6       if (LunManagerWatch(req->getLUNlist(), req->getInterval(),
7                       tlist, map))
8       {
9           rep->setTransList(tlist);
10          rep->setIOStatus(SUCCESS);
11      }
12      else rep->setIOStatus(FAILURE);
13      delete req;
14      outQueue->queue(rep);
15  }
1   void rearrange (RearrangeRequest* req, RearrangeOrMoveReply* rep,
2           internalArrayMap* map, IOReplyQueue* outQueue)
3   {
4       systemWaitUntil(req->getWhen());
5       if (LunManagerRearrange(req->getBy(), req->getTransList(), map))
6           rep->setIOStatus(SUCCESS);
7       else rep->setIOStatus(FAILURE);
8       delete req;
9       outQueue->queue(rep);
10  }
```

The routine "IORequestHandler" receives pointers to the inQueue (704 in FIG. 7), the outQueue (710 in FIG. 7), a map of the physical locations of all LUNs within the disk array, and a container "iluns" that contains instances of the class "IO_LUN" for each LUN provided by the disk array controller. On line 10, IORequestHandler calls a routine "initialize" to carry out any initialization operations on the I/O queues. These initialization operations are, for the most part, dependent on implementations of other portions of the disk array controller that are beyond the scope of the present invention, and are therefore not described in an implementation of the routine "initialize."

On lines 11–17, IORequestHandler starts execution of a separate instance of the routine "IOHandler" for each LUN. The bulk of the processing carried out by IORequestHandler occurs in the loop comprising lines 18–97. This loop is terminated only when one or both of the inQueue and outQueue (704 and 710 in FIG. 7, respectively) are terminated. On line 23, IORequestHandler checks to see if the inQueue is empty and, if so, calls a system function "systemWaitOnQueueEvent" to wait until an I/O request is queued to the inQueue. Once a next I/O request is available for processing, IORequestHandler dequeues that I/O request from the inQueue, on line 21. In the series of if and else-if statements starting in line 22, IORequestHandler processes each type of incoming command. If the incoming command is a READ or WRITE command, as detected by IORequestHandler on lines 22 and 23, then on lines 25–27, IORequestHandler forwards the request to he appropriate IORequestQueue associated with the LUN to which the READ or WRITE command is directed. If, on the other hand, the received I/O command relates to the ALOWI interface, the command is processed in the else-if statements on lines 29–96.

If the incoming command is a WATCH command, as detected by IORequestHandler on line 29, then IORequestHandler creates a WatchReply object on line 32 and fills in various fields of the WatchReply object on lines 33–36. On line 37, IORequestHandler starts up a separate thread to execute the routine "Watch," provided below, to carry out monitoring of set of LUNs according to the parameters contained in the WATCH command dequeued from the IORequestQueue. A separate thread is started monitoring may continue for a lengthy period of time. In the meantime, on lines 38–44, IORequestHandler prepares a second WatchReply with an I/O status of "QUEUED" and queues the second WatchReply object to the outQueue to return to the host computer from which the WATCH command was received.

If the dequeued I/O command is a REARRANGE command, as detected on line 46 by IORequestHandler, then IORequestHandler carrier out processing similar to that which occurs for a WATCH command, the difference being that a thread is started to execute the routine "rearrange," on line 55, to rearrange a set of LUNs according to a proposed rearrangement provided in the REARRANGE command.

If the dequeued I/O request represents a MOVELUN command, as detected by IORequestHandler on line 64, then IORequestHandler prepares a RearrangeOrMoveReply object on line 68, sets various fields of the RearrangeOrMoveReply object on lines 69–72, and then calls the LUN Manager routine "LunManagerMove" on line 73 to forcibly separate a LUN indicated in the physical LUN translation supplied in the MoveRequest from disks that include the physical mapping also supplied in the physical LUN translation in the MOVELUN command, as discussed above. Depending on the outcome of the routine "LunManagerMove," IORequestHandler sets the I/O status of the RearrangeOrMoveReply object to SUCCESS, on line 74, or FAILURE, on line 75, and then queues the RearrangeOrMoveReply to the outQueue for return to the requesting host computer.

If the dequeued I/O request represents a TRANSLATE command, as detected by IORequestHandler on line 79, then IORequestHandler extracts a physical translation for a LUN from the internalArrayMap "map" and returns the physical translation to the requesting host computer via the outQueue on line 94. Finally, on lines 98–108, once one or both of the inQueue and outQueue are terminated, IORequestHandler terminates all of the IOreqQ queues and thus terminates all of the I/OHandler threads launched in the while-loop comprising lines 11–17.

The routine "watch," provided above, runs asynchronously, using supplied parameters to call the LUN Manager routine "LunManagerWatch," on line 6, in order to carry out the WATCH command. Depending on the outcome of the routine "LunManagerWatch," the routine "watch" sets the I/O status to either SUCCESS, on line 10, or to FAILURE, on line 12, and then queues a WatchReply object to the outQueue before returning to the host computer. The routine "rearrange," also provided above, similarly processes a REARRANGE command by calling the LUN Manager routine "LunManagerRearrange," on line 5.

The functional interface provided by the ALOWI to a human user or an application program will next be described in a series of flow-control diagrams. This functional interface comprises the routines "watch," "rearrange," "separateAndWatch," and "physicalLocation."

Figure 8:
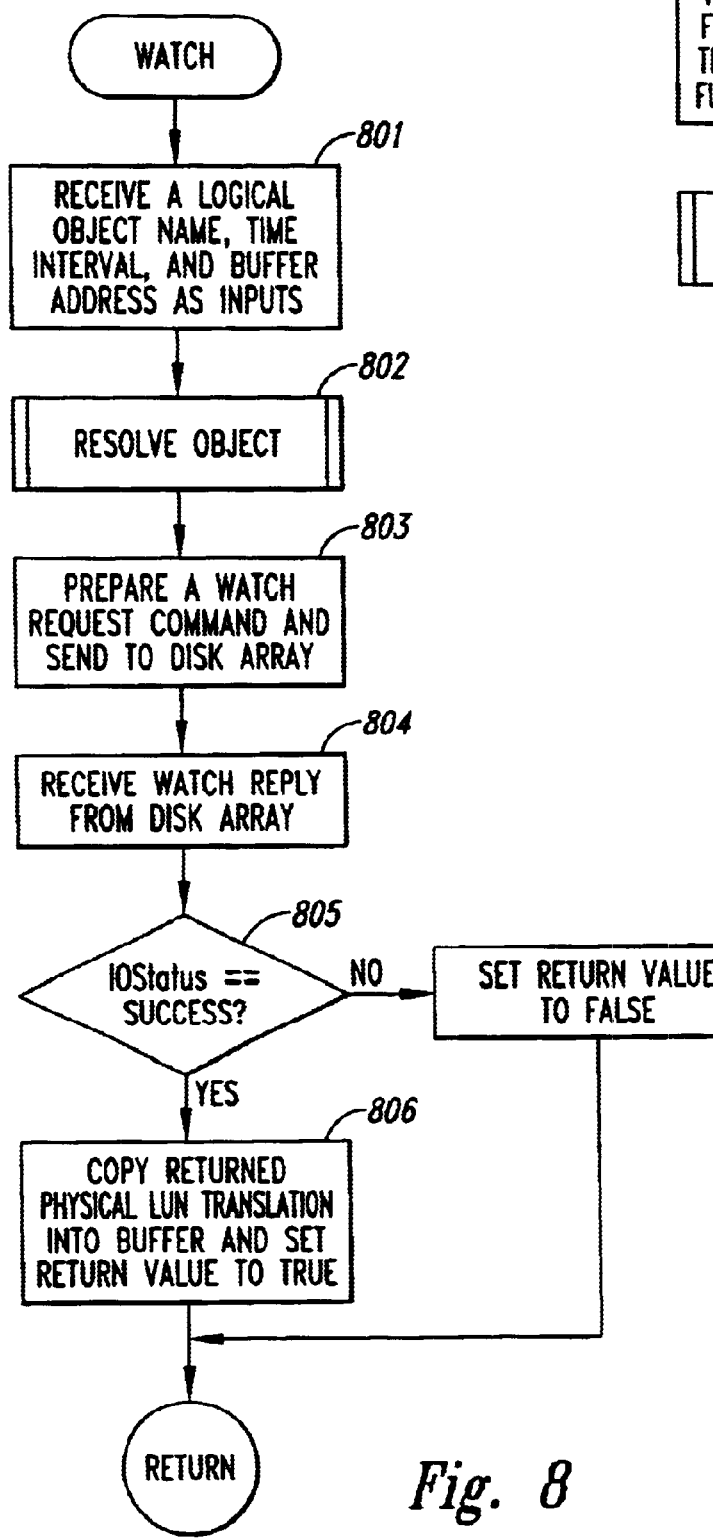
FIG. 8 is a flow-control diagram for the routine "watch."

FIG. 8 is a flow-control diagram for the routine "watch." This routine allows a human user or APP on a host computer to request a disk array to monitor activity within the disk array related to a specified logical object and to return a proposed rearrangement of the LUNs to which the logical object is mapped in order to optimize I/O activity directed to the logical object. In step 801, the routine "watch" receives a logical object name, a time interval, and a buffer address as inputs, the time interval argument specifying the time interval during which the disk array should monitor I/O activity directed to the logical object name, and the buffer address argument specifying the place in which the proposed rearrangement information returned by the disk array will be stored. In step 802, the routine "watch" calls ResolveObject functionality currently provided for host computers, to resolve the logical object into a list of one or more LUNs. In step 803, the routine "watch" prepares a WATCH I/O command, using a WatchRequest object provided in the above C++-like pseudocode implementation, and sends the WATCH command to the disk array via an operating-system-supplied communication interface. In step 804, the routine "watch" receives the response to the WATCH command from the disk array. Note that, in this implementation, the routine "watch" blocks during monitoring by the disk array. In the next implementation, to be described below, an asynchronous thread or process is launched in order to carry out an I/O command. An asynchronous paradigm may also be employed in an alternative implementation of the routine "watch." If the WATCH is successfully executed by the disk array, as detected by the routine "watch" in step 805, then the routine "watch" copies the returned physicalLunTransList into the buffer described by the buffer address argument in step 801, sets a return value to TRUE, in step 806, and then returns. Otherwise, in step 807, the routine "watch" sets the return value to FALSE and then returns.

Figure 9:
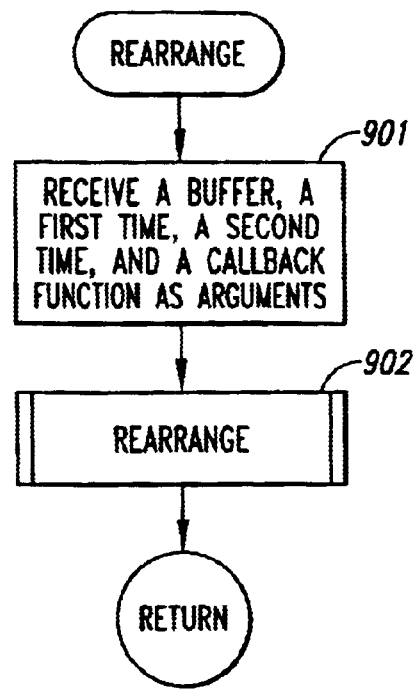
FIG. 9 is a flow-control diagram for the routine "rearrange."

FIG. 9 is a flow-control diagram for the routine "rearrange." This routine directs the disk array to rearrange the LUNs to which a logical object is mapped according to a proposed rearrangement returned by the disk array in a preceding call to the function "watch" described above. In step 901, the routine "rearrange" receives a buffer pointer, a first time, a second time, and a callback function pointer as arguments. The buffer pointer points to a proposed rearrangement, residing in a physicalLunTransList, the first time argument indicates the time when the rearrange command is to be processed by the disk array, the second time argument indicates a maximum amount of time the disk array should spend processing the rearrange command, and the callback function pointer points to a function to be called when the rearrangement has been executed. Then, in step 902, the routine "rearrange" launches an asynchronous thread or process, depending on the implementation style, to execute the routine "rearrangement_async," and then returns.

Figure 10:
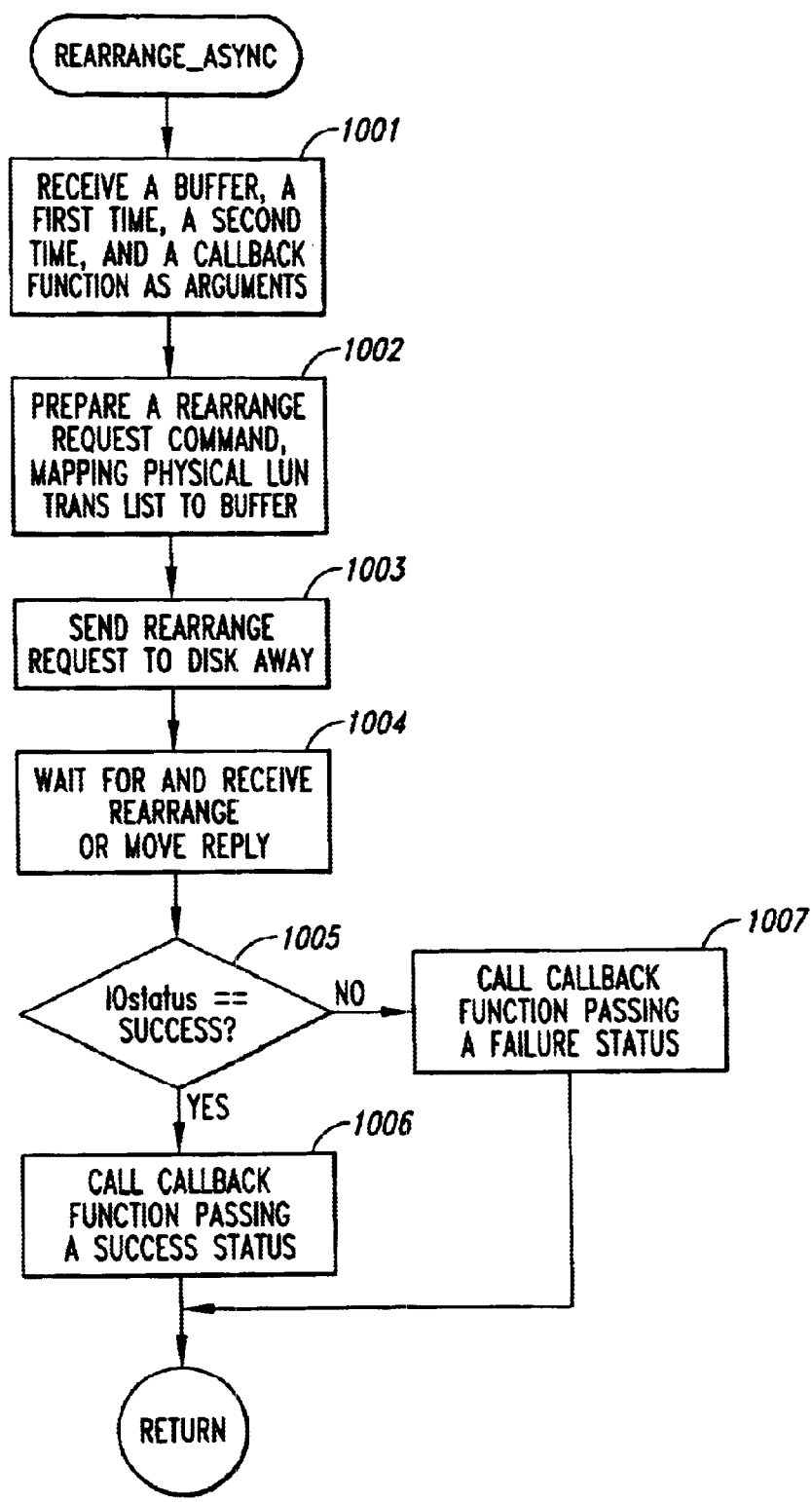
FIG. 10 is a flow-control diagram for the routine "rearrange_async."

FIG. 10 is a flow-control diagram for the routine "rearrange_async." This routine is launched from the previously described routine "rearrange" in step 902. In step 1001, the routine "rearrange_async" receives the arguments passed initially to the routine "rearrange" in step 901 of FIG. 9. In step 1002, the routine "rearrange_async" prepares a RearrangeRequest object using the supplied arguments. In step 1003, the routine "rearrange_async" transmits the REARRANGE command represented by the RearrangeRequest object to the disk array via an operating-system-supplied communications interface. Then, in step 1004, the routine "rearrange_async" waits for, and finally receives, a response from the disk array to the REARRANGE command. If the response contains an I/O status indicating success, as detected by rearrange_async in step 1005, then, in step 1006, rearrange_async calls the callback function, passing to that function a SUCCESS status, and returns. Otherwise, in step 1007, rearrange_async calls the callback function and passes the callback function a FAILURE status and returns. Note that the callback function may, in turn, initiate a number of different events on the host computer to notify either a human user or an APP that the rearrange command has been executed. For example, an email may be sent to a human user, the appearance of an icon on a human user's screen may be altered, a pager number may be dialed and a message transmitted to the pager, or a second callback routine within an APP may be invoked.

Figure 11:
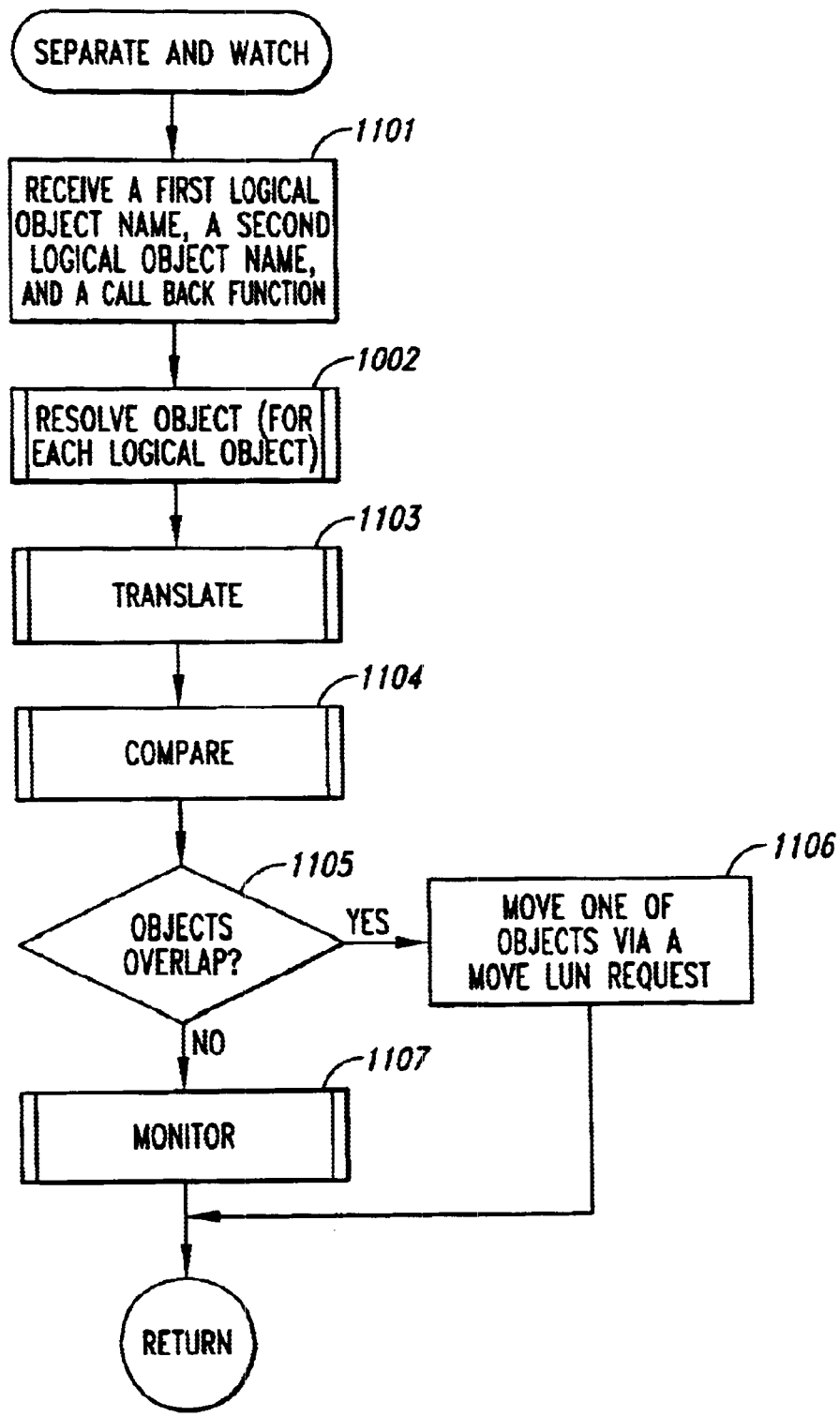
FIG. 11 is a flow-control diagram for the routine "separateAndWatch."

FIG. 11 is a flow-control diagram for the routine "Separate And Watch." The routine "separateAndWatch" allows a human user or high-level application program to specify the names of two logical objects that the routine then physically separates from one another and subsequently monitors the placement of the logical objects to ensure that the two logical objects remain physically separated. A disk array may constantly remap physical objects, in order to optimize access to the objects, relocate objects around failed disk drives, or for other reasons. Therefore, when two logical objects are separated, their physical locations must be continuously monitored in order to ensure that they are not subsequently remapped partially or fully onto a common disk drive. In step 1101, the routine "separateAndWatch" receives, as arguments, the names of two logical objects to separate as well as a pointer to a callback function. In step 1102, the routine "separateAndWatch" calls the existing ResolveObject functionality on the host computer to translate each logical object name into a list of LUNs onto which the logical object is mapped. In step 1103, the routine "separateAndWatch" calls the routine "TRANSLATE," described below, to translate the list of LUNs to which each logical object has been resolved in step 1102 to lists of physical extents or, in other words, physical translation lists. In step 1104, the two physical translation lists are compared, via a call to the routine "Compare," described below, in order to determine whether the two logical objects overlap. If the two logical objects overlap as detected in step 1105, then the routine "separateAndWatch" prepares and transmits a MOVELUN Request to the disk array on which the logical objects are stored in order to physically separate the logical objects in step 1106. Note that, in a complete implementation, the returned I/O status in the response to the MOVELUN command returned to the routine "separateAndWatch" from the disk array should be checked in step 1106 and, if the returned I/O status is not SUCCESS, then the routine "separateAndWatch" should return an error indication and terminate. This error handling is not explicitly shown in the flow-control diagram of FIG. 11 for the sake of brevity, and because similar error handling has been explicitly shown in previous flow-control diagrams and in the C++-like pseudocode implementation. Finally, in step 1107, the routine "separateAndWatch" calls the routine "monitor," described below, to continuously check that the two logical objects remain physically separated. The routine "monitor" continues to execute asynchronously, while the routine "separateAndWatch" returns following invocation of the routine "monitor."

Figure 12:
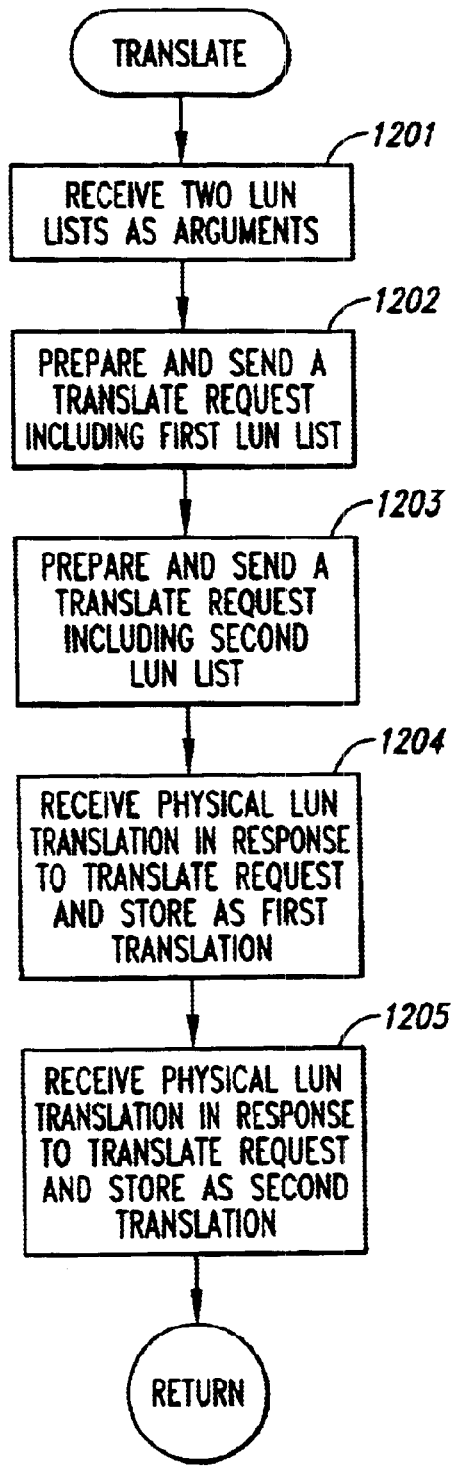
FIG. 12 is a flow-control diagram of the routine "translate."

FIG. 12 is a flow-control diagram of the routine "translate." This routine is called from step 1103 of the routine "separateAndWatch." The routine "translate," in step 1201, receives two lists of LUNs that represent the mapping of two logical objects to LUNs within a disk array. In step 1202, the routine "translate" prepares and sends a translate request for the first received list of LUNs to the disk array, and, in step 1203, prepares and sends a translate request to the disk array for the second list of LUNs. In steps 1204 and 1205, the routine "translate" receives the returned physical LUN translations from the disk array in response to the translate request messages sent to the disk array, and stores the returned physical LUN translations for subsequent access by the calling routine.

Figure 13:
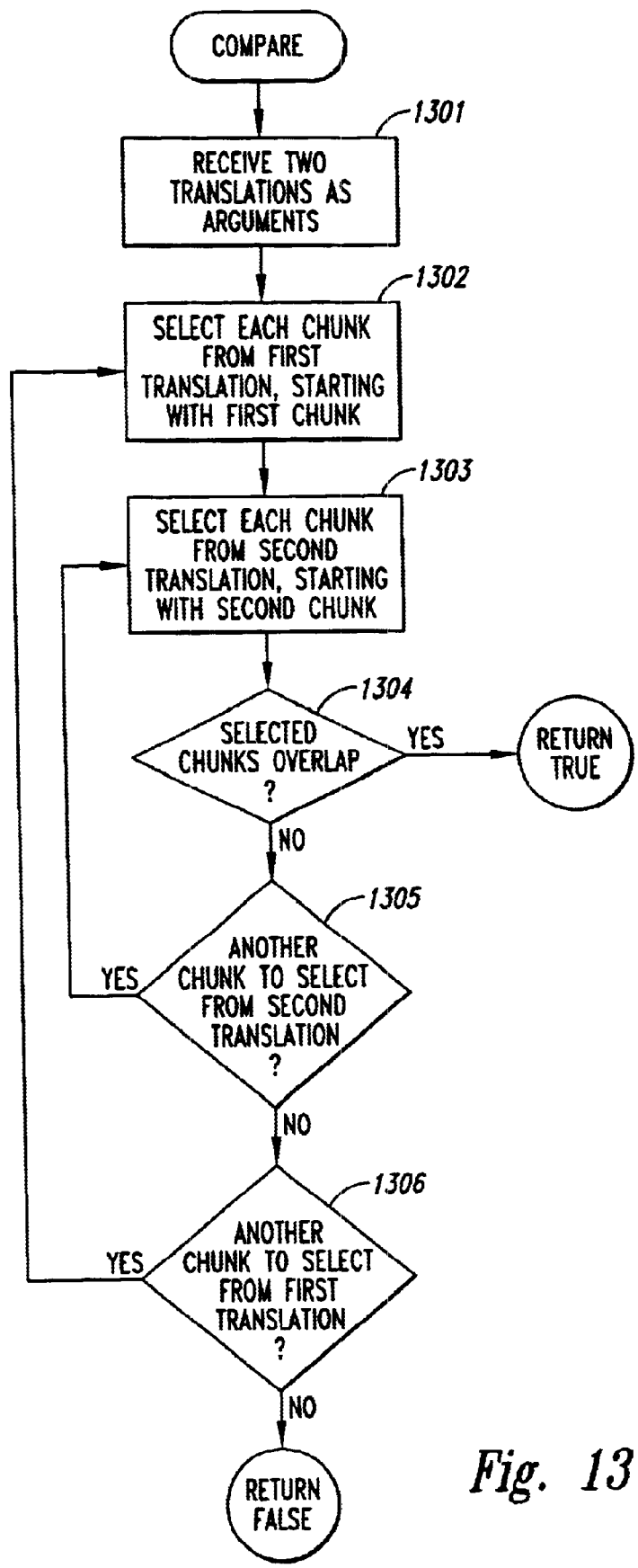
FIG. 13 is a flow-control diagram for the routine "compare."

FIG. 13 is a flow-control diagram for the routine "compare." The routine "compare" compares two physical translation lists representing the physical mapping of two logical objects within a disk array in order to determine whether there is any overlap between the physical storage locations of the two logical objects. In step 1301, the routine "compare" receives two physical translation lists as arguments. Steps 1302–1306 together compose two nested while-loops that operate to compare each extent in the first physical translation list with each extent in the second physical translation list. If any of the comparisons indicate an overlap between a physical extent of the first translation list with a physical extent of the second physical translation list, as detected in step 1304, then the routine "compare" returns a value of TRUE. Otherwise, the routine "compare" returns the value FALSE.

Figure 14:
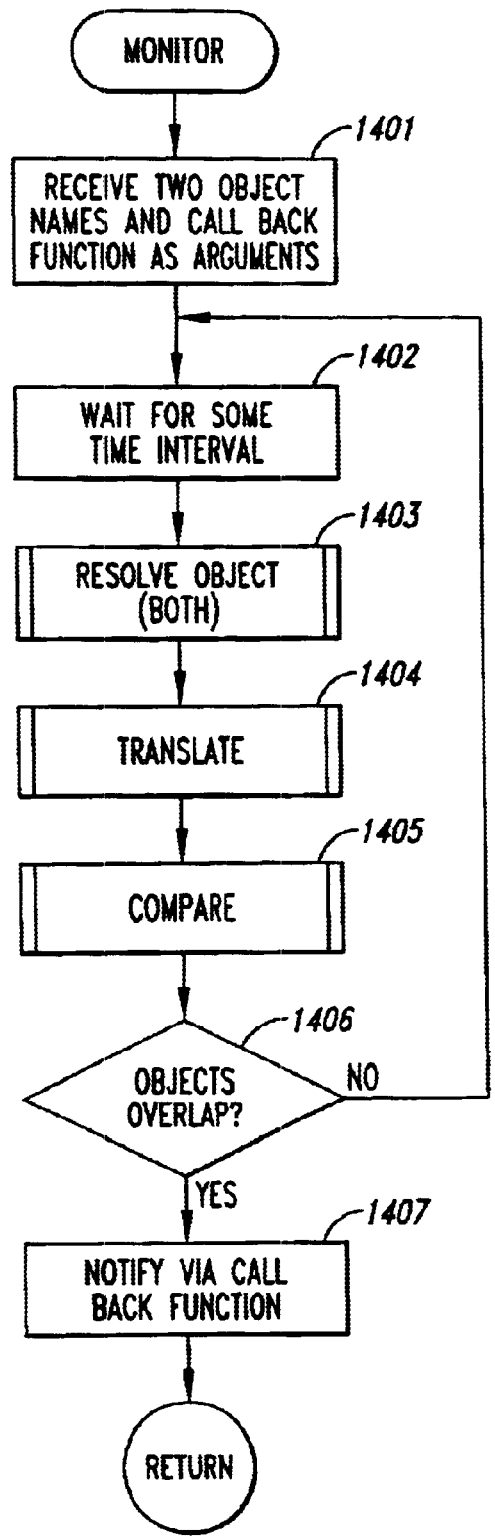
FIG. 14 is a flow-control diagram for the routine "monitor."

FIG. 14 is a flow-control diagram for the routine "monitor." This routine is called in step 1107 of the routine "separateAndWatch." The routine "monitor" runs asynchronously, continuously monitoring the physical separation of two logical objects. If, at any point, the routine "monitor" detects that the two logical objects partially or completely physically overlap, then the routine "monitor" notifies either a human user or an APP, via a callback function, to allow the human-user or APP to take appropriate action to either re-separate the logical objects or to otherwise provide for the possibility that both logical objects may be irretrievably corrupted by a single disk failure. In step 1401, the routine "monitor" receives the names of two logical objects and a pointer to a callback function. In step 1402, the routine "monitor" waits for some specific time interval, as it is not essential for the monitoring to run continuously, but only that physical separation of the two logical objects is tracked at regular time intervals. In step 1403, the routine "monitor" calls existing ResolveObject functionality on the host computer to resolve each logical object into a LUN list. In step 1404, the routine "monitor" calls the routine "translate," described above, and in step 1405, the routine "monitor" calls the routine "compare," also described above. The result of calling these two routines is a Boolean value indicating whether or not the two logical objects physically overlap. If the two logical objects physically overlap, as detected in step 1406, then the routine "monitor," in step 1407, calls the callback function in order to alert either a human user or an APP to the detected physical overlap. Otherwise, the routine "monitor" loops back to step 1402.

Figure 15:
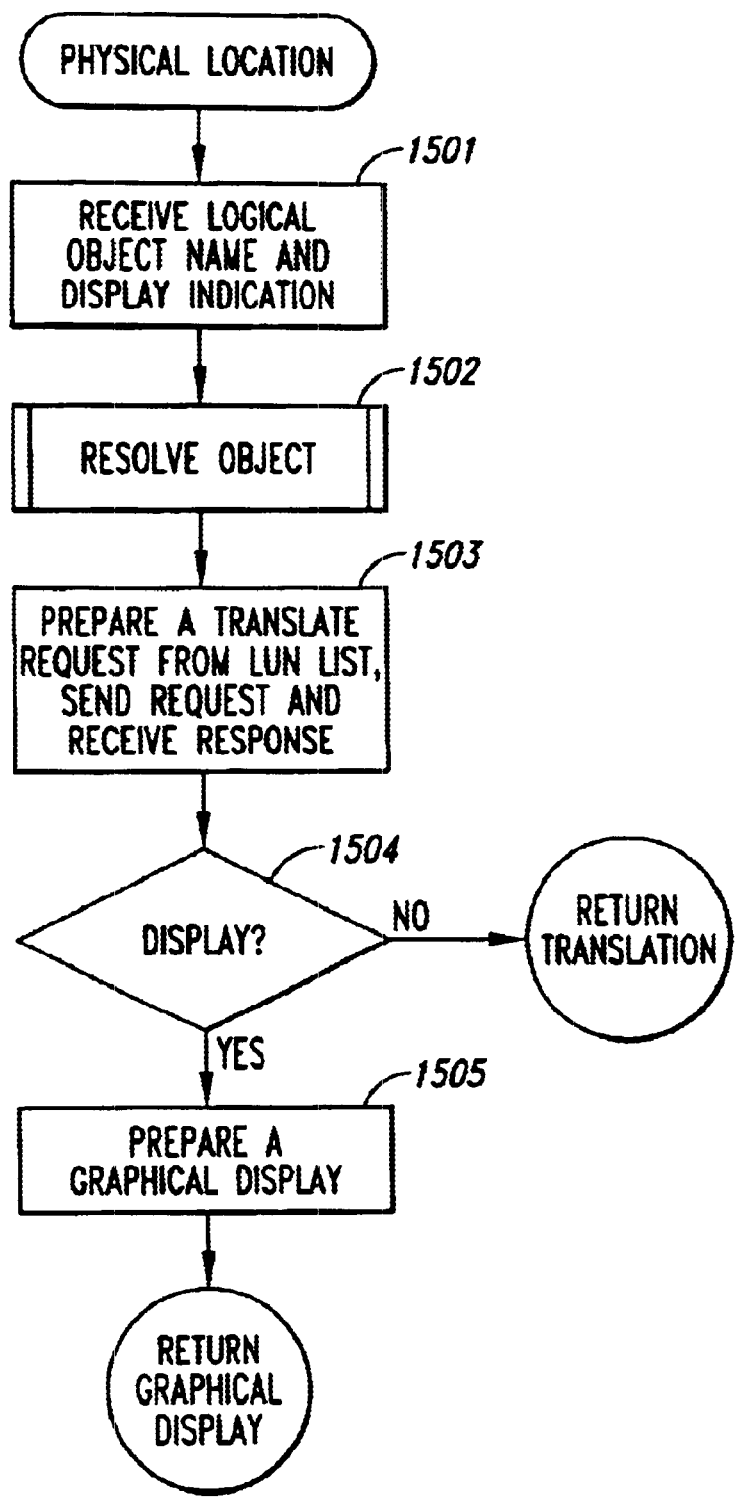
FIG. 15 is a flow-control diagram for the routine "physicalLocation."
Figure 16:
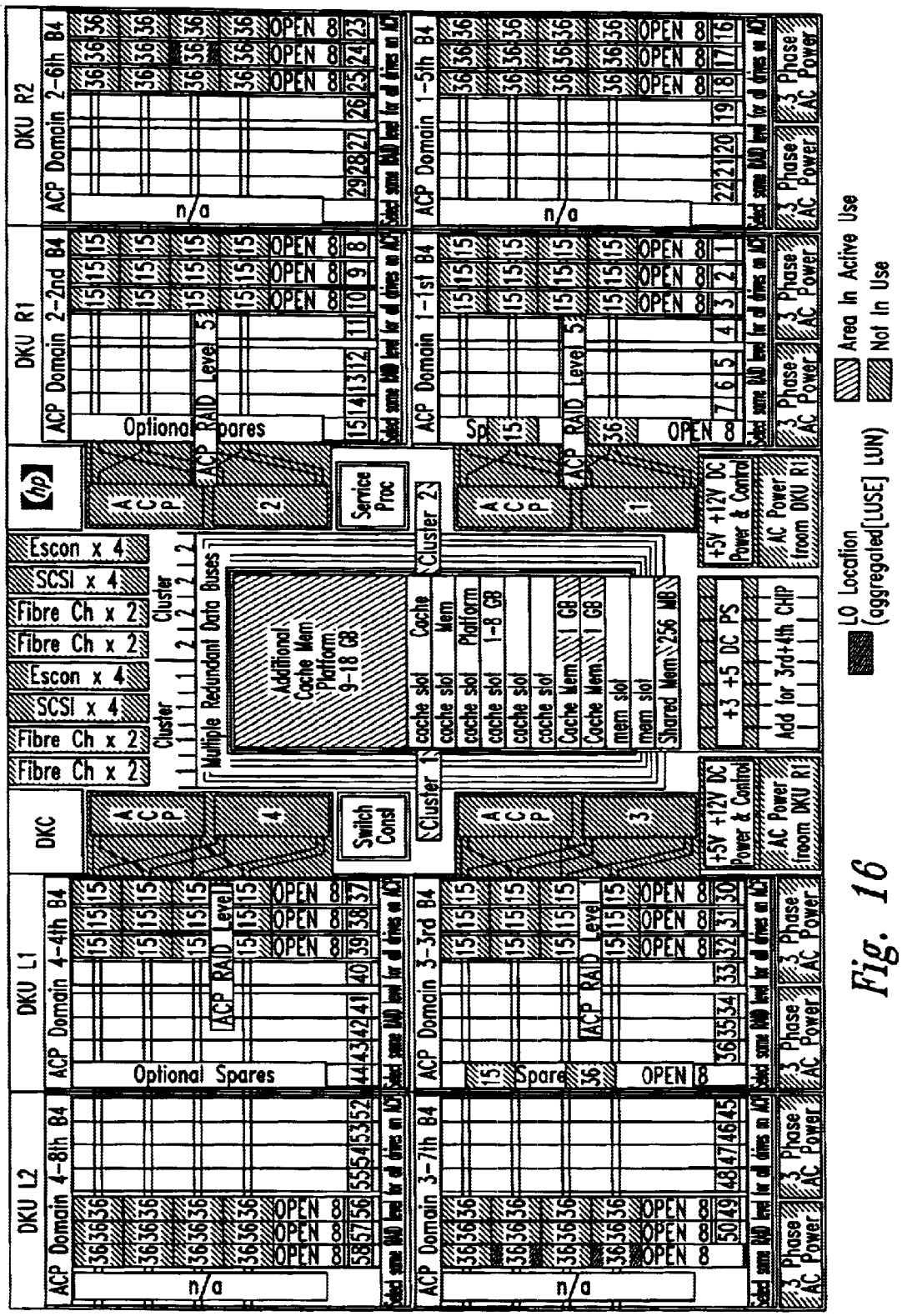
FIG. 16 illustrates an example of a graphical display of the mapping of a logical object onto physical disks within a disk array.

FIG. 15 is a flow-control diagram for the routine "physicalLocation." This routine resolves a logical object name, provided as an argument in step 1501, into a LUN list in step 1502 and then, in step 1503, obtains a physical mapping for the logical object from a disk array via a TRANSLATE command. In step 1504, the routine "physicalLocation" determines whether or not to graphically display the physical translation. If a graphical display is not indicated, then the physical location is returned. Otherwise, a graphical display is prepared in step 1505 and displayed to a human user. FIG. 16 illustrates an example of a graphical display of the mapping of a logical object onto physical disks within a disk array.

Although the present invention has been described in terms of a particular embodiment, it is not intended that the invention be limited to this embodiment. Modifications within the spirit of the invention will be apparent to those skilled in the art. For example, an almost limitless number of different types of hardware and software implementations may be used to implement the logical object name translation and logic separation and monitoring functionality provided by the combination of the HLOWI and ALOWI. An almost limitless number of functional interfaces may be provided by the HLOWI and ALOWI that result in the same conceptual functional interfaces provided by the implementations discussed above. Functionality may be moved from the ALOWI to the HLOWI, and vice versa. While the above implementations are related to logical name translation and separation within disk arrays, the same principles can be applied to many different types of mass storage devices. The current invention is not restricted to any particular type of mass storage device. Many different types of design and programming methodologies may be used to accomplish the relatively long-executing monitoring and rearrangement tasks, and many different types of methodologies may be used to return results to a human user or a high-level application program. Processes may launch threads or other processes, which carry out the tasks synchronously, as described above, or processes may simply block, waiting for I/O requests to be executed on a disk array, as also described above. Other paradigms are possible. While the functional interface described above included functions for physically separating and monitoring two logical objects, functions for physically separating and monitoring more than two logical objects are easily implemented in similar fashion, are within the scope of the invention. In the above implementation, callback functions are employed for notification of logical object overlap and other conditions, but shared memory data structures and other techniques may be alternatively employed.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A system for identifying the storage locations of a logical object stored within a mass storage device and for physically separating and monitoring the physical separation of a number of logical objects, the system comprising:
    a mass storage device that includes a number of internal storage devices and a controller that maps logical units to storage locations on the internal storage devices;
    a host device that includes a logical object engine that maps a logical object to one or more logical units provided by the mass storage device and that provides retrieval of data from, and storage of data to, the logical objects; and
    a functional interface provided on the host device that provides translation of a specified logical object to storage locations on the internal storage devices of the mass storage device, physical separation of a number of logical objects so that no internal storage device contains data of more than one of the number of logical objects, and monitoring of the physical separation of a number of logical objects.

2. The system of claim 1 wherein a function of the functional interface that provides translation of a specified logical object to storage locations on the internal storage devices of the mass storage device receives, as an argument, the name of the logical object, translates the name of the logical object to indications of one or more logical units via the logical object engine, transmits the indications of the one or more logical units to the mass storage device, receives from the mass storage device indications of one or more internal storage devices onto which the one or more logical units are mapped, and returns indications of the one or more internal storage devices.

3. The system of claim 2 wherein the function of the functional interface that provides translation of a specified logical object to storage locations on the internal storage devices of the mass storage device returns indications of the one or more internal storage devices to a user by graphically displaying the indications of the one or more internal storage devices within a graphical display of the internal storage devices contained within the mass storage device.

4. The system of claim 2 wherein the function of the functional interface that provides translation of a specified logical object to storage locations on the internal storage devices of the mass storage device returns indications of the one or more internal storage devices to a calling program.

5. The system of claim 1 wherein a function of the functional interface that provides physical separation of a number of logical objects, so that no internal storage device contains data of more than one of the number of logical objects, receives, as arguments, the names of the logical objects, translates each name of the logical objects to indications of one or more logical units via the logical object engine, transmits the indications of the one or more logical units to the mass storage device for each logical object, and receives from the mass storage device an indication of whether or not the number of logical objects are successfully physically separated by the mass storage device controller.

6. The system of claim 5 wherein the function of the functional interface that provides physical separation of a number of logical objects, so that no internal storage device contains data of more than one of the number of logical objects, additionally invokes monitoring of the physical separation of the number of logical objects by the controller of the mass storage device.

7. The system of claim 6 wherein, when the controller of the mass storage device detects that an internal storage device contains data of more than one logical object, the controller transmits a warning message to the host device which then issues a notification of logical object overlap.

8. The system of claim 7 wherein the host device issues a notification of logical object overlap by notifying a user via a visual notification displayed on a visual display device.

9. The system of claim 7 wherein the host device issues a notification of logical object overlap by notifying a user via transmission of an electronic notification to a user device.

10. The system of claim 7 wherein the host device issues a notification of logical object overlap by notifying an application program via one of:

a callback function; and a shared memory data structure.

11. The system of claim 1 wherein the functional interface provided on the host device also provides for analysis of input and output activity directed towards a selected logical object and for rearrangement of the storage locations of the object according to the analysis in order to optimize subsequent input and output activity directed towards the selected logical object.

12. The system of claim 11 wherein the functional interface provided on the host device provides for analysis of input and output activity directed towards a selected logical object by receiving the name of the logical object as an argument, translate the name of the logical objects to indications of one or more logical units via the logical object engine, transmits the indications of the one or more logical units to the mass storage device, and receives from the mass storage device a report of the analysis.

13. The system of claim 1 wherein the functional interface provided on the host device provides for rearrangement of the storage locations of an object according to the analysis and transmits the analysis to the mass storage device, and receives from the mass storage device an indication of whether or not the storage locations of the object rearrangement are successfully rearranged.

14. The system of claim 1 wherein the host device is a computer and the mass storage device is a disk array interconnected to the host device via a communications medium.

15. A method for physically separating and monitoring the physical separation of two logical objects, the method comprising:

providing a routine that receives names of a first logical object and a second logical object, resolves the first and second logical object names into two lists of one or more logical units, transmits the two lists of one or more logical units to the mass storage device along with an invocation of a separating and monitoring function on the mass storage device;

invoking the routine on a host device to receive names of a first logical object and a second logical object, resolve the first and second logical object names into two lists of one or more logical units, transmits the two lists of one or more logical units to the mass storage device along with an invocation of a separating and monitoring function on the mass storage device;

receiving the two lists of one or more logical units and physically separating the data stored in the two lists of logical objects by the separating and monitoring function;

returning an indication to the routine that the mass storage device physically separated the data stored in the two logical objects;

continuously monitoring the separation of the data stored in the two logical objects by the mass storage device; and when the mass storage device detects that a single internal storage device contains data of both logical objects, returning a notification to the host device.

16. The method of claim 15 wherein the notification returned to the host device is then returned by the host device to a user via one of:

email;

a graphical display; and an electronic message delivered to a communications device.

17. The method of claim 15 wherein the notification returned to the host device is then returned by the host device to an application program by one of:

a call back function;

a shared memory data structure.

* * * * *

UNITED STATES PATENT AND TRADEMARK OFFICE
CERTIFICATE OF CORRECTION

| | | |
|---|---|---|
| PATENT NO. | : 6,687,805 B1 | Page 1 of 1 |
| APPLICATION NO. | : 09/699596 | |
| DATED | : February 3, 2004 | |
| INVENTOR(S) | : Robert Alan Cochran | |

It is certified that error appears in the above-identified patent and that said Letters Patent is hereby corrected as shown below:

Column 27, Claim 13, Line 28, Delete "claim 1" and insert therefor --claim 11--

Column 28, Claim 17, Line 38, After the semicolon insert --and--

Signed and Sealed this

Twelfth Day of August, 2008

JON W. DUDAS
*Director of the United States Patent and Trademark Office*